US012803012B2

(12) United States Patent
Nagumo et al.

(10) Patent No.: US 12,803,012 B2
(45) Date of Patent: Nov. 17, 2026

(54) FUEL CELL STACK

(71) Applicant: Honda Motor Co., Ltd., Tokyo (JP)

(72) Inventors: Kenji Nagumo, Wako (JP); Naoki Tanaka, Wako (JP); Kensuke Umezawa, Wako (JP); Fumiya Arai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 473 days.

(21) Appl. No.: 18/587,478

(22) Filed: Feb. 26, 2024

(65) Prior Publication Data

US 2024/0304834 A1 Sep. 12, 2024

(30) Foreign Application Priority Data

Mar. 8, 2023 (JP) ................................ 2023-035425

(51) Int. Cl.
*H01M 8/2483* (2016.01)
*H01M 8/0265* (2016.01)

(52) U.S. Cl.
CPC ....... *H01M 8/0265* (2013.01); *H01M 8/2483* (2016.02)

(58) Field of Classification Search
None
See application file for complete search history.

(56) References Cited

U.S. PATENT DOCUMENTS

2008/0138684 A1* 6/2008 Lewinski .............. H01M 8/026 429/534
2012/0040259 A1* 2/2012 Tomura ............... H01M 8/0267 429/414
2018/0241069 A1* 8/2018 Nonoyama ......... H01M 8/2483
2019/0305339 A1* 10/2019 Ikeda ................ H01M 8/04201

FOREIGN PATENT DOCUMENTS

CN 108933272 B * 10/2021 ............ H01M 8/242
JP 3113340 B2 * 11/2000
JP 2017033695 A * 2/2017
JP 2018133287 A 4/2020

OTHER PUBLICATIONS

CN-108933272 Machine Translation (Year: 2021).*
JP-3113340 Machine Translation (Year: 2000).*
JP-2017033695 Machine Translation (Year: 2017).*

* cited by examiner

*Primary Examiner* — Ula C Ruddock
*Assistant Examiner* — Anna Korovina
(74) *Attorney, Agent, or Firm* — Duft & Bornsen, PC

(57) ABSTRACT

A fuel cell stack including an outside unit disposed outside a cell stacked body and a communicating tube disposed in an exhaust gas flow path to communicate with an upstream and downstream sides of the exhaust gas flow path through a first and second opening. A first and second support portions supporting a first and second end portions on a first and second end sides of the communicating tube are formed in tubular shapes so as to surround the first and second end portions and communicate an internal space of the communicating tube with the exhaust gas flow path. The first and second support portions include tapered portions so that edge portions on outer peripheral surface sides of the first and second end surfaces are capable of abutting on peripheral surfaces of through-holes over a half circumference or longer in a circumferential direction, respectively.

10 Claims, 14 Drawing Sheets

FUEL CELL STACK

CROSS-REFERENCE TO RELATED APPLICATION

This application is based upon and claims the benefit of priority from Japanese Patent Application No. 2023-035425 filed on Mar. 8, 2023, the content of which is incorporated herein by reference.

BACKGROUND OF THE INVENTION

Field of the Invention

This invention relates to a fuel cell stack.

Description of the Related Art

Conventionally, there has been known a fuel cell stack in which a tube is disposed in a fuel gas discharge flow path and water retained in the fuel gas discharge flow path is discharged through the tube. Such a fuel cell stack is disclosed in, for example, Japanese Patent Publication No. 6690574 (JP 6690574 B). In the fuel cell stack disclosed in JP6690574B, holding portions are provided in exhaust gas discharge holes of a plurality of frames stacked via a separator, and the tube is held by the holding portions.

However, in the fuel cell stack disclosed in JP6690574B, positions of an end of the tube may shift from a proper position due to vibration or fluid forces caused by a flow of reaction gas, because the end of the tube is not sufficiently positioned.

SUMMARY OF THE INVENTION

An aspect of the present invention is a fuel cell stack including: a cell stacked body formed by stacking a plurality of power generation cells each having an electrolyte membrane in a predetermined direction; an exhaust gas flow path penetrating the cell stacked body in the predetermined direction so as to discharge a reaction gas supplied to the plurality of power generation cells; an outside unit disposed outside the cell stacked body in the predetermined direction; and a communicating tube disposed in the exhaust gas flow path so as to communicate with an upstream side and a downstream side of the exhaust gas flow path respectively through a first opening provided on a first end surface of the communicating tube and a second opening provided on a second surface of the communicating tube. The outside unit includes a first support portion and a second support portion to support a first end portion on a side of the first end surface of the communicating tube and a second end portion on a side of the second end surface of the communicating tube, respectively, the first support portion is formed in a tubular shape around an axis so as to surround the first end portion of the communicating tube and communicate an internal space of the communicating tube with the upstream side of the exhaust gas flow path, the second support portion is formed in a tubular shape around an axis so as to surround the second end portion of the communicating tube and communicate the internal space of the communicating tube with the downstream side of the exhaust gas flow path, a first through-hole and a second through-hole are provided inside the first support portion and the second support portion along the axis, respectively, and each of the first through-hole and the second through-hole includes a tapered portion formed in a tapered shape around the axis so that an edge portion on an outer peripheral surface side of the first end surface and an edge portion on an outer peripheral surface side of the second end surface are capable of abutting on peripheral surfaces of the first through-hole and the second through-hole over a half circumference or longer in a circumferential direction, respectively, when the communicating tube is inserted.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 12D. A fuel cell stack according to an embodiment of the present invention is a component of a fuel cell. The fuel cell is mounted on, for example, a vehicle and can generate electric power for driving the vehicle. First, an overall configuration of the fuel cell stack will be schematically described.

Figure 1:
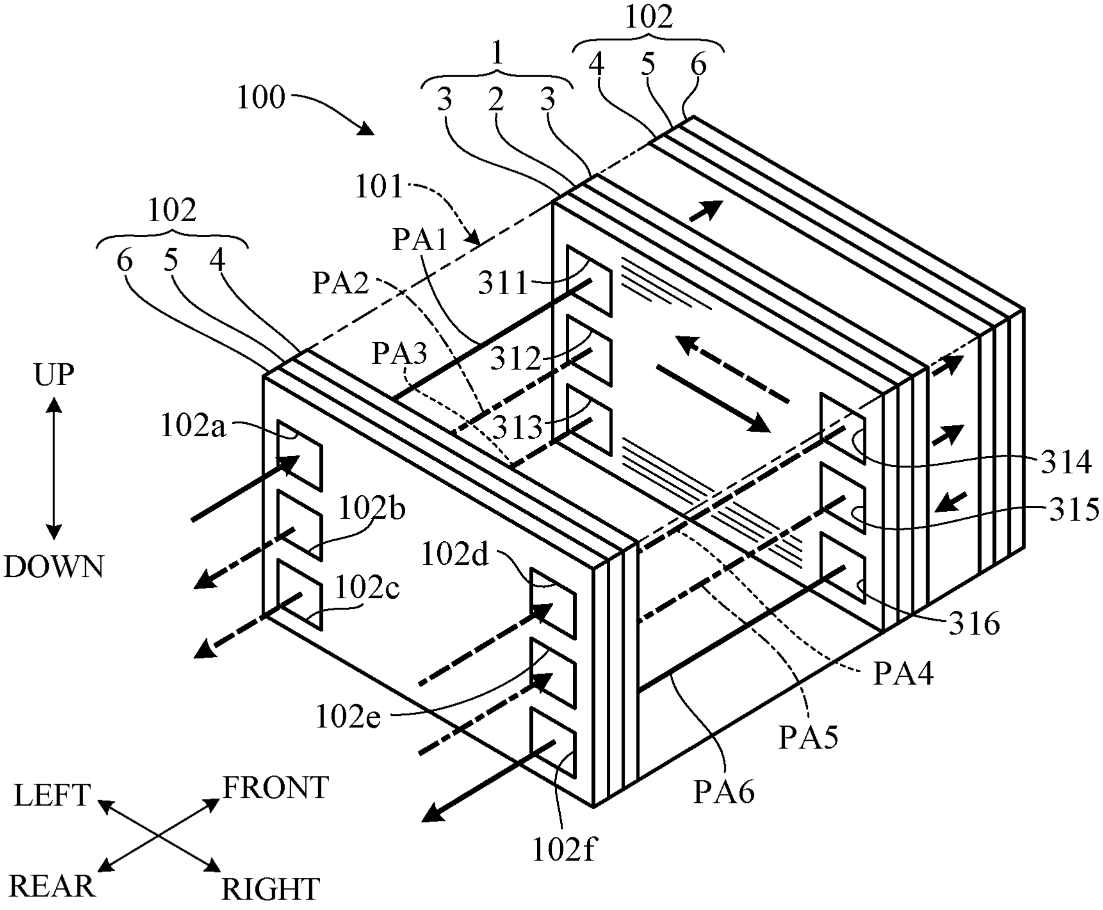
FIG. 1 is a perspective view schematically showing an overall configuration of a fuel cell stack according to an embodiment of the present invention.

FIG. 1 is a perspective view schematically showing an overall configuration of a fuel cell stack 100 according to the embodiment of the present invention. Hereinafter, for the sake of convenience, three-axis directions orthogonal to each other as illustrated in the drawing are defined as a front-rear direction, a left-right direction, and an up-down direction, and a configuration of each unit will be described according to such definitions. These directions are not necessarily identical to a front-rear direction, a left-right direction, and an up-down direction of the vehicle. For example, the front-rear direction in FIG. 1 may be the front-rear direction, the left-right direction, or the up-down direction of the vehicle.

As illustrated in FIG. 1, the fuel cell stack 100 includes a cell stacked body 101 formed by stacking a plurality of power generation cells 1 in the front-rear direction, and end units 102 disposed at both front and rear ends of the cell stacked body 101, and has a substantially rectangular parallelepiped shape as a whole. A length of the cell stacked body 101 in the left-right direction is longer than a length in the up-down direction. In FIG. 1, a single power generation cell 1 is shown for the sake of convenience. The power generation cell 1 includes a unitized electrode assembly (UEA) 2 having a membrane electrode assembly including an electrolyte membrane and an electrode, and separators 3 and 3 that are disposed on both front and rear sides of the unitized electrode assembly 2 and sandwich the unitized electrode assembly 2. The unitized electrode assembly 2 and the separators 3 are alternately disposed in the front-rear direction. The unitized electrode assembly 2 may be called a membrane electrode structural body.

The separator 3 includes a pair of front and rear metal thin plates having a corrugated cross section, and is integrally formed by joining outer peripheral edges of the thin plates. For the separator 3, a conductive material having excellent corrosion resistance is used, and for example, titanium, a titanium alloy, stainless steel, or the like can be used. A cooling flow path through which a cooling medium flows is formed inside the separator 3 (between the pair of thin plates) by press-molding or the like, and a power generation surface of the power generation cell 1 is cooled by the flow of the cooling medium. For example, water can be used as the cooling medium. Surfaces (front surface and rear surface) of the separators 3 facing the unitized electrode assembly 2 are formed in an uneven shape to form gas flow paths between the separators and the membrane electrode assembly of the unitized electrode assembly 2.

The front separator 3 of the unitized electrode assembly 2 is, for example, a separator on an anode side (anode separator), and an anode flow path through which a fuel gas flows is formed between the anode separator 3 and the membrane electrode assembly of the unitized electrode assembly 2. The rear separator 3 of the unitized electrode assembly 2 is, for example, a separator on a cathode side (cathode separator), and a cathode flow path through which an oxidant gas flows is formed between the cathode separator 3 and the membrane electrode assembly of the unitized electrode assembly 2. For example, a hydrogen gas can be used as the fuel gas, and for example, air can be used as the oxidant gas. The fuel gas and the oxidant gas may be referred to as a reaction gas without being distinguished from each other.

Figure 2:
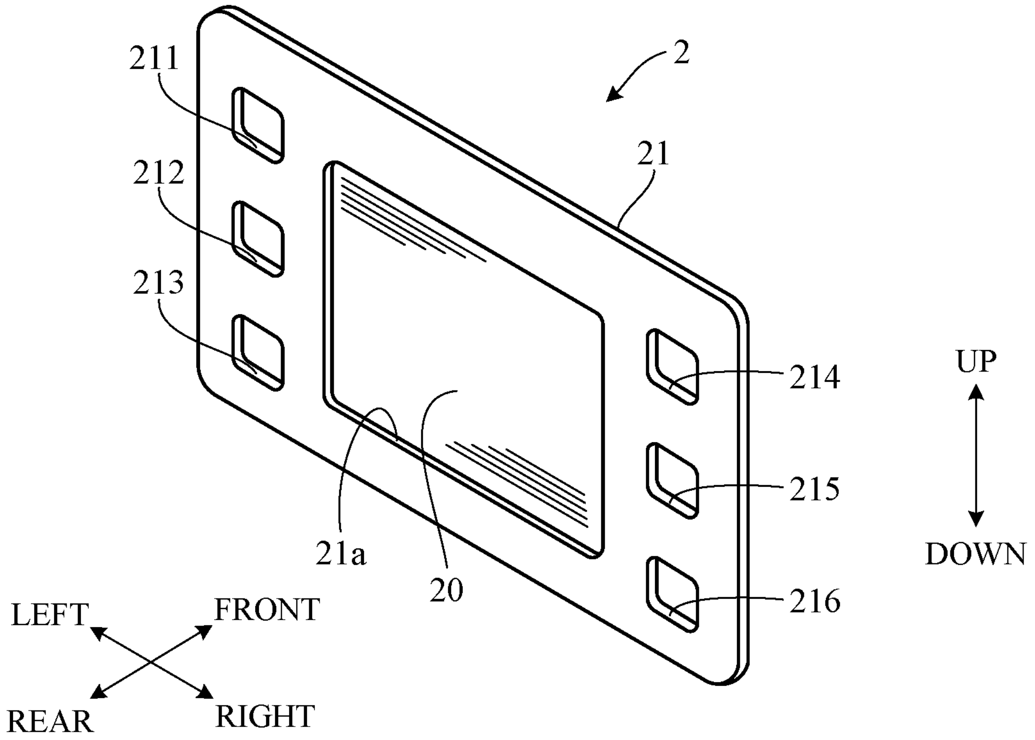
FIG. 2 is a perspective view illustrating schematic configuration of a unitized electrode assembly included in the fuel cell stack of FIG. 1.

FIG. 2 is a perspective view illustrating a schematic configuration of the unitized electrode assembly 2. As illustrated in FIG. 2, the unitized electrode assembly 2 includes a substantially rectangular membrane electrode assembly (MEA) 20 and a frame 21 that supports the membrane electrode assembly 20. The membrane electrode assembly 20 has an electrolyte membrane, an anode electrode provided on a front surface of the electrolyte membrane, and a cathode electrode provided on a rear surface of the electrolyte membrane.

The electrolyte membrane is, for example, a solid polymer electrolyte membrane, and a thin film of perfluorosulfonic acid containing moisture can be used. Not only a fluorine-based electrolyte but also a hydrocarbon-based electrolyte can be used.

The anode electrode has an electrode catalyst layer formed on a front surface of the electrolyte membrane and served as a reaction field of electrode reaction, and a gas diffusion layer formed on a front surface of the electrode catalyst layer to spread and supply the reaction gas. The cathode electrode has an electrode catalyst layer formed on a rear surface of the electrolyte membrane and served as a reaction field of electrode reaction, and a gas diffusion layer formed on a rear surface of the electrode catalyst layer to spread and supply the reaction gas. The electrode catalyst layer includes a catalytic metal that promotes an electrochemical reaction between hydrogen contained in the fuel gas and oxygen contained in the oxidant gas, an electrolyte having proton conductivity, carbon particles having electron conductivity, and the like. The gas diffusion layer is made of a conductive member having gas permeability, for example, a carbon porous body.

In the anode electrode, the fuel gas (hydrogen) supplied through the anode flow path and the gas diffusion layer is ionized by an action of a catalyst, passes through the electrolyte membrane, and moves to the cathode electrode side. Electrons generated at this time pass through an external circuit and are extracted as electric energy. In the cathode electrode, an oxidant gas (oxygen) supplied via the cathode flow path and the gas diffusion layer reacts with hydrogen ions guided from the anode electrode and electrons moved from the anode electrode to generate water. The generated water gives an appropriate humidity to the electrolyte membrane, and excess water is discharged to an outside of the unitized electrode assembly 2.

The frame 21 is a thin plate having a substantially rectangular shape, and is made of an insulating resin, rubber, or the like. A substantially rectangular opening 21*a* is provided in a central portion of the frame 21. The membrane electrode assembly 20 is disposed to cover the entire opening 21*a* and supported by a peripheral portion of the opening 21*a*. Three through-holes 211 to 213 penetrating the frame 21 in the front-rear direction are opened side by side in the up-down direction on a left side of the opening 21*a* of the frame 21, and three through-holes 214 to 216 penetrating the frame 21 in the front-rear direction are opened side by side in the up-down direction on a right side of the opening 21*a*.

As shown in FIG. 1, through-holes 311 to 316 penetrating the separators 3 in the front-rear direction are opened in the front and rear separators 3 of the unitized electrode assembly 2 at positions corresponding to the through-holes 211 to 216 of the frame 21. The through-holes 311 to 316 communicate with the through-holes 211 to 216 of the frame 21. The set of the through-holes 211 to 216 and 311 to 316 communicating with each other forms flow paths PA1 to PA6 (indicated by arrows for the sake of convenience) penetrating the cell stacked body 101 and extending in the front-rear direction. The flow paths PA1 to PA6 may be referred to as manifolds. The flow paths PA1 to PA6 are connected to a manifold outside the fuel cell stack 100.

The flow path PA1 (solid arrow) extending forward via the through-holes 211 and 311 is a fuel gas supply flow path. The flow path PA6 (solid arrow) extending rearward via the through-holes 216 and 316 is a fuel gas discharge flow path. The fuel gas supply flow path PA1 and the fuel gas discharge flow path PA6 communicate with the anode flow path facing the front surface of the membrane electrode assembly 20, and as indicated by the solid arrows, the fuel gas flows through the anode flow path from left to right via the fuel gas supply flow path PA1 and the fuel gas discharge flow path PA6. The communication between the anode flow path and the other flow paths PA2 to PA5 is blocked via seal portions not shown. The fuel gas flowing through the fuel gas discharge flow path PA6 is a fuel gas after a part of the supplied fuel gas has been used in the anode electrode, and may be referred to as a fuel exhaust gas.

The flow path PA4 (dotted arrow) extending forward via the through-holes 214 and 314 is an oxidant gas supply flow path. The flow path PA3 (dotted arrow) extending rearward via the through-holes 213 and 313 is an oxidant gas discharge flow path. The oxidant gas supply flow path PA4 and the oxidant gas discharge flow path PA3 communicate with the cathode flow path facing a rear surface of the membrane electrode assembly 20, and as indicated by the dotted arrows, the oxidant gas flows through the cathode flow path from right to left via the oxidant gas supply flow path PA4 and the oxidant gas discharge flow path PA3. The communication between the cathode flow path and the other flow paths PA1, PA2, PA5 and PA6 is blocked via seal portions not shown. The oxidant gas flowing through the oxidant gas discharge flow path PA3 is an oxidant gas after a part of the supplied oxidant gas has been used in the cathode electrode, and may be referred to as oxidant exhaust gas. The fuel exhaust gas and the oxidant exhaust gas may be referred to as a reaction exhaust gas without being distinguished from each other.

The flow path PA5 (dashed-dotted line arrow) extending forward via the through-holes 215 and 315 is a cooling medium supply flow path. The flow path PA2 (dashed-dotted line arrow) extending rearward via the through-holes 212 and 312 is a cooling medium discharge flow path. The cooling medium supply flow path PA5 and the cooling medium discharge flow path PA2 communicate with the cooling flow path inside the separator 3, and the cooling medium flows through the cooling flow path via the cooling medium supply flow path PA5 and the cooling medium discharge flow path PA2. The communication between the cooling flow path and the other flow paths PA1, PA3, PA4 and PA6 is blocked via seal portions not shown.

Each of the end units 102 disposed on both the front and rear sides of the cell stacked body 101 includes a terminal plate 4, an insulating plate 5, and an end plate 6. The front end unit 102 may be referred to as a dry-side end unit, and the rear end unit 102 may be referred to as a wet-side end unit. The pair of front and rear terminal plates 4 and 4 is disposed on both front and rear sides of the cell stacked body 101 with the cell stacked body interposed therebetween. The pair of front and rear insulating plates 5 and 5 is disposed on both front and rear sides of the terminal plates 4 and 4. The pair of front and rear end plates 6 and 6 is disposed on both front and rear sides of the insulating plates 5 and 5.

The terminal plate 4 is a substantially rectangular plate-shaped member made of metal, and has a terminal portion for extracting electric power generated by an electrochemical reaction in the cell stacked body 101. The insulating plate 5 is a substantially rectangular plate-shaped member made of non-conductive resin or rubber, and electrically insulates the terminal plate 4 from the end plate 6. The end plate 6 is a plate-shaped member made of metal or resin having high strength, and for example, a coupling member elongated in the front-rear direction which couples the front and rear end plates 6 and 6 to each other is fixed to the end plate 6 with a bolt. The fuel cell stack 100 is held in a state of being pressed in the front-rear direction by the end plates 6 and 6 via the coupling member. A case enclosing the cell stacked body 101 may be used as a coupling member, and end plates 6 and 6 may be fixed to the front and rear end surfaces of the case, respectively.

A plurality of through-holes 102*a* to 102*f* penetrating the rear end unit 102 in the front-rear direction are opened in the rear end unit 102. The through-holes 102*a* to 102*f* include a through-hole penetrating the terminal plate 4, a through-hole penetrating the insulating plate 5, and a through-hole penetrating the end plate 6. In FIG. 1, these through-holes are collectively referred to as through-holes 102*a* to 102*f* for the sake of convenience. The through-hole 102*a* is opened on an extension line of the fuel gas supply flow path PA1 to communicate with the fuel gas supply flow path PA1. The through-hole 102*b* is opened on an extension line of the cooling medium discharge flow path PA2 to communicate with the cooling medium discharge flow path PA2. The through-hole 102*c* is opened on an extension line of the oxidant gas discharge flow path PA3 to communicate with the oxidant gas discharge flow path PA3. The through-hole 102*d* is opened on an extension line of the oxidant gas supply flow path PA4 to communicate with the oxidant gas supply flow path PA4. The through-hole 102*e* is opened on an extension line of the cooling medium supply flow path PA5 to communicate with the cooling medium supply flow path PA5. The through-hole 102*f* is opened on an extension line of the fuel gas discharge flow path PA6 to communicate with the fuel gas discharge flow path PA6.

More specifically, a fuel gas tank storing a high-pressure fuel gas is connected to the through-hole 102*a* via an ejector, an injector, or the like, and the fuel gas in the fuel gas tank is supplied to the fuel cell stack 100 via the through-hole 102*a*. A gas-liquid separator is connected to the through-hole 102*f*, and a fuel gas (fuel exhaust gas) discharged via the through-hole 102*f* is separated into a fuel gas and water by the gas-liquid separator. The separated fuel gas is sucked via the ejector and is supplied to fuel cell stack 100 again. The separated water is discharged to an outside via a drain flow path.

A compressor for supplying the oxidant gas is connected to the through-hole 102*d*, and the oxidant gas compressed by the compressor is supplied to fuel cell stack 100 via the through-hole 102*d*. The oxidant gas (oxidant exhaust gas) flows to an outside from the through-hole 102*c*. A pump for supplying the cooling medium is connected to the through-hole 102*e*, and the cooling medium is supplied to the fuel cell stack 100 via the through-hole 102*e*. The cooling medium is discharged from the through-hole 102*b*. The discharged cooling medium is cooled by heat exchange in a radiator, and is supplied to the fuel cell stack 100 again via the through-hole 102*e*.

A schematic configuration of the fuel cell stack 100 has been described above. The fuel cell stack 100 is housed in a substantially box-shaped case and is mounted on the vehicle.

Among the flow paths PA1 to PA3 provided on the left side of the fuel cell stack 100, the flow path PA3 for discharging the oxidant gas is provided below the other flow paths PA1 and PA2. Among the flow paths PA4 to PA6 provided on the right side of the fuel cell stack 100, the flow path PA6 for discharging the fuel gas is provided below the other flow paths PA4 and PA5. In other words, the flow paths PA3 and PA6 for reaction exhaust gas are provided at the lowermost portion of the fuel cell stack 100.

Meanwhile, in the cathode electrode, hydrogen ions, electrons, and oxygen react to generate water. This water flows to the oxidant gas discharge flow path PA3 through the cathode flow path and is discharged together with the oxidant exhaust gas, but may be retained in the oxidant gas discharge flow path PA3. On the other hand, in the anode electrode, water is generated by diffusion from the cathode electrode side through the electrolyte membrane. This water flows to the fuel gas discharge flow path PA6 through the anode flow path and is discharged together with the fuel exhaust gas, but may be retained in the fuel gas discharge flow path PA6. The oxidant gas discharge flow path PA3 and the fuel gas discharge flow path PA6 are collectively referred to as a reaction exhaust gas flow path. Water generated by dew condensation may also be retained in the lowermost reaction exhaust gas flow paths PA3 and PA6.

When water is retained in the reaction exhaust gas flow paths PA6 and PA3 as described above, a flow of the reaction exhaust gas may be hindered and power generation performance may be deteriorated. For this reason, it is necessary to quickly discharge retained water in the reaction exhaust gas flow paths PA3 and PA6 to the outside of the fuel cell stack 100, and it is preferable to enhance drainage performance of the fuel cell stack 100. In the present embodiment, the drainage performance is improved as follows.

Figure 3:
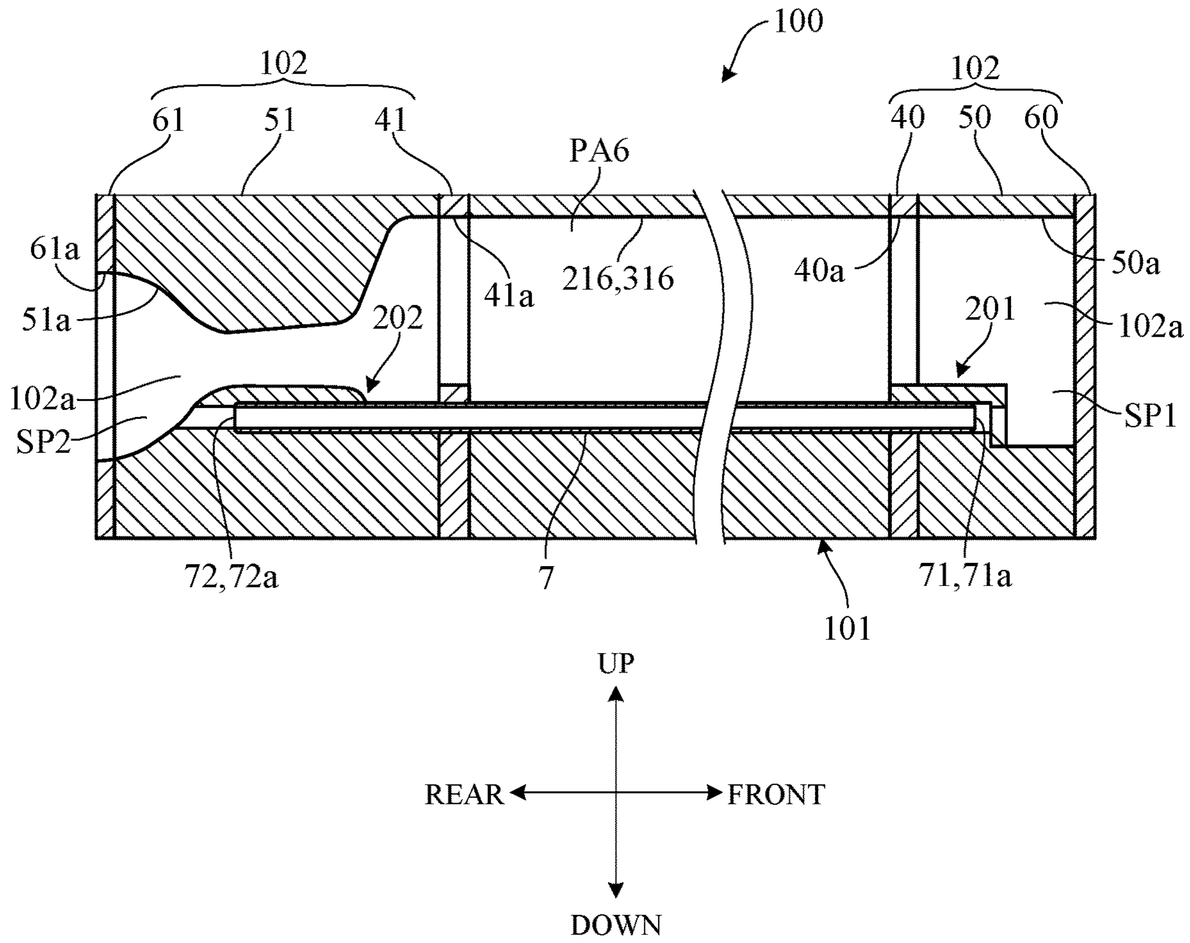
FIG. 3 is a cross-sectional view showing a configuration of a main part of the fuel cell stack along a fuel gas discharge flow path of FIG. 1.

The configurations of the oxidant gas discharge flow path PA3 and the fuel gas discharge flow path PA6 are substantially the same. Therefore, hereinafter, the configurations of the reaction exhaust gas flow paths PA3 and PA6 will be described focusing on the fuel gas discharge flow path PA6. FIG. 3 is a cross-sectional view showing a configuration of a main part of the fuel cell stack 100 along the fuel gas discharge flow path PA6.

In FIG. 3, individual illustration of power generation cell 1 is omitted. In FIG. 3, in order to distinguish the configurations of front and rear end units 102, the front end unit 102 is represented by a terminal plate 40, an insulating plate 50, and an end plate 60, and the rear end unit 102 is represented by a terminal plate 41, an insulating plate 51, and an end plate 61.

As illustrated in FIG. 3, the fuel gas discharge flow path PA6 extends in the front-rear direction through the through-hole 102*a* of the rear end unit 102, through-holes 216 and 316 of the cell stacked body 101, and the through-hole 102*a* of the front end unit 102. Therefore, the end unit 102 and the cell stacked body 101 form the fuel gas discharge flow path PA6 and configure a flow path forming portion. The through-hole 102*a* of the front end unit 102 includes a through-hole 40*a* of the terminal plate 40 and a through-hole 50*a* of the insulating plate 51. The front end of the fuel gas discharge flow path PA6 is closed by the end plate 60. The through-hole 102*a* of the rear end unit 102 includes a through-hole 41*a* of the terminal plate 41, a through-hole 51*a* of the insulating plate 51, and a through-hole 61*a* of the end plate 61.

In the fuel gas discharge flow path PA6, a communicating tube 7 is installed along a flow path bottom surface. The communicating tube 7 is an elongated tube member having a substantially cylindrical cross section in which an opening (front end opening 71*a*, rear end opening 72*a*) is provided in each of the front end surface 71 and the rear end surface 72, and linearly extends in the front-rear direction through the cell stacked body 101. The front end opening 71*a* of the communicating tube 7 is located inside an internal space SP1 of the through-hole 102*a* of the front end unit 102, more specifically, inside the through-hole 50*a* of the insulating plate 50. The rear end opening 72*a* of the communicating tube 7 is located in an internal space SP2 of the through-hole 102*a* of the rear end unit 102, more specifically, inside the through-hole 51*a* of the insulating plate 51. Therefore, the internal space SP1 of the front end unit 102 and the internal space SP2 of the rear end unit 102 communicate with each other through the communicating tube 7.

The communicating tube 7 is made of resin, rubber, glass, or the like as a component material. However, considering that vibration and temperature change occurs in the fuel cell stack 100, the communicating tube 7 is preferably made of flexible resin or rubber. In the communicating tube 7, water flows from the front end opening 71*a* to the rear end opening 72*a* according to a pressure difference between the internal spaces SP1 and SP2 of the front and rear end units 102 and 102. Therefore, although a cross-sectional area of the communicating tube 7 is sufficiently smaller than a cross-sectional area of the fuel gas discharge flow path PA6, the cross-sectional area of the communicating tube 7 is set so as to enable a flow of a predetermined amount or more of water.

The front end portion of the communicating tube 7 is supported by a front support portion 201 provided in the front end unit 102, and the rear end portion of the communicating tube 7 is supported by a rear support portion 202 provided in the rear end unit 102.

Figure 4A:
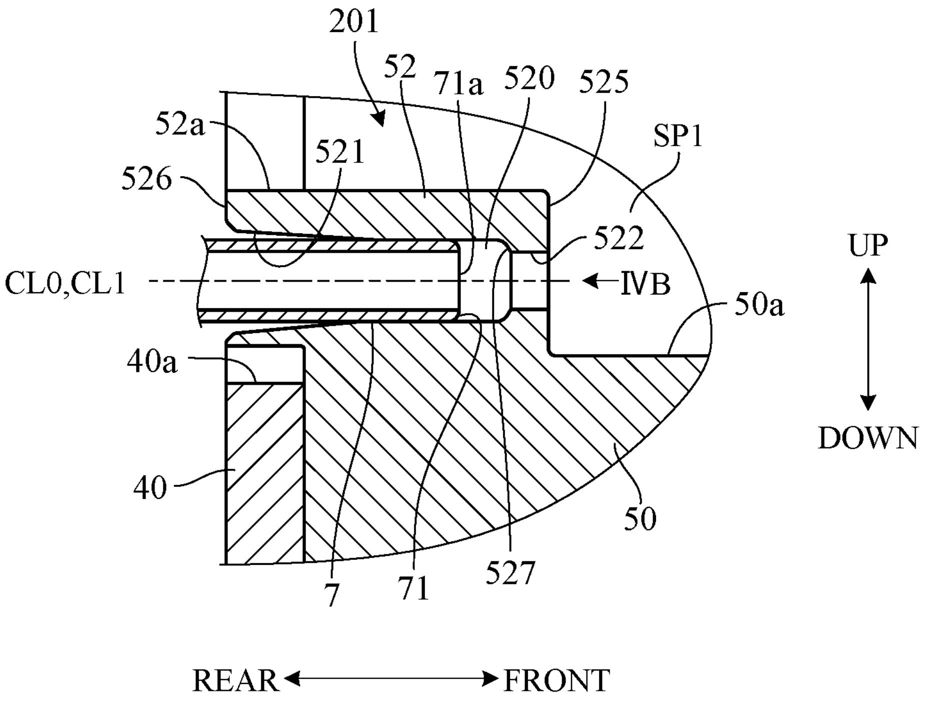
FIG. 4A is an enlarged view of a main part of FIG. 3 illustrating a configuration of a front support portion included in the fuel cell stack according to the embodiment of the present invention.
Figure 4B:
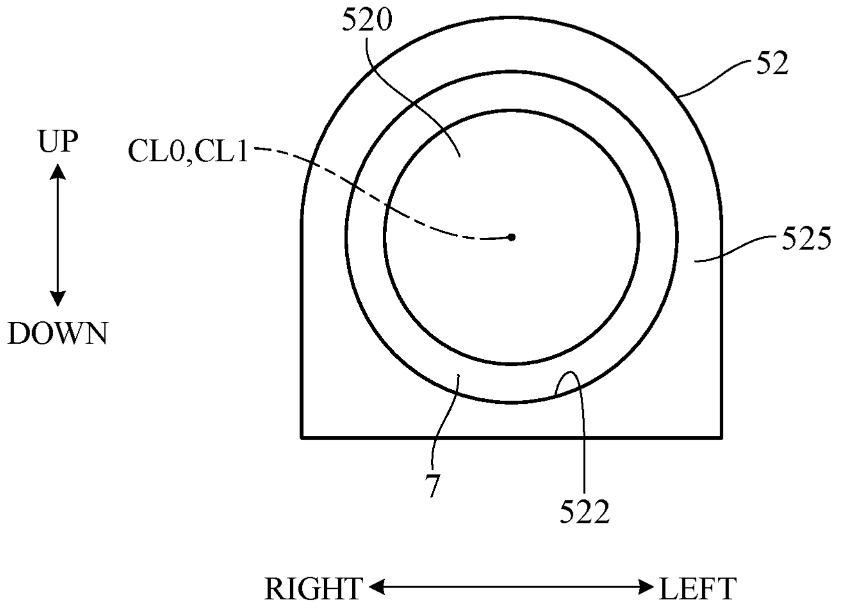
FIG. 4B is a view taken along an arrow IVB of FIG. 4A.

FIG. 4A is an enlarged view of a main part of FIG. 3 illustrating a configuration of the front support portion 201, and FIG. 4B is a view taken along an arrow IVB in FIG. 4A (viewed from the front). As illustrated in FIGS. 4A and 4B, a bulge 52 bulging upward is provided on a bottom surface of the through-hole 50*a* of the insulating plate 50 at a region to an intermediate portion in the front-rear direction from a rear end portion thereof. In FIG. 4A, the bulge 52 has a protrusion 52*a* protruding rearward, and the protrusion 52*a* is positioned inside the through-hole 40*a* of the terminal plate 40. Thus, the insulating plate 50 is partially elongated in the front-rear direction, and the front end portion of the communicating tube 7 is supported by the elongated portion.

A through-hole 520 having a circular cross section around an axis CL0 extending in the front-rear direction is opened in the bulge 52 from the front end surface 525 to a rear end surface 526. The through-hole 520 includes a tapered portion 521 on a rear side of a boundary surface 527 and a straight portion 522 on a front side of the boundary surface 527 with the boundary surface 527 extending in a vertical direction perpendicular to the axis CL0 as a boundary.

The tapered portion 521 is formed in a tapered shape such that a cross-sectional area gradually decreases from the rear end surface 526 of the bulge 52 to the boundary surface 527. That is, the tapered portion 521 is formed to have a space of a truncated cone inside. The straight portion 522 is formed linearly with a constant or substantially constant cross-sectional area from the front end surface 525 of the bulge 52 to the boundary surface 527. A cross-sectional area of the straight portion 522 is smaller than a cross-sectional area of the front end of the tapered portion 521. An angle formed by the tapered portion 521 with respect to the axis CL0 is about several degrees (for example, 2 to 3° to 4 to 5°), and a length of the tapered portion 521 in the front-rear direction is longer than a length of the straight portion 522 in the front-rear direction. A chamfered portion is provided at a rear end corner of the tapered portion 521 so as to facilitate insertion of the communicating tube 7.

A diameter of an outer peripheral surface of the communicating tube 7 is larger than a diameter of the front end surface (boundary surface 527) of the tapered portion 521 and smaller than a diameter of the rear end surface 526 of the tapered portion 521. A diameter of an inner peripheral surface of the communicating tube 7 is smaller than a diameter of the straight portion 522. As a result, when the communicating tube 7 is inserted into the through-hole 520 from the rear of the bulge 52, an outer peripheral corner of the front end of the communicating tube 7 abuts on a peripheral surface of the tapered portion 521, and a center line CL1 of the communicating tube 7 coincides with the axis CL0. As a result, the front end portion of the communicating tube 7 can be supported from the insulating plate 50 while the front end portion of the communicating tube 7 is positioned by the tapered portion 521. Since a movement of the communicating tube 7 is restricted by the tapered portion 521, positional displacement of the communicating tube 7 can be prevented. In a state where the communicating tube 7 is supported by the front support portion 201, the front end opening 71*a* of the communicating tube 7 communicates with the internal space SP1 of the end unit 102, more specifically, the internal space SP1 in front of the bulge 52 through the through-hole 520.

Figure 5A:
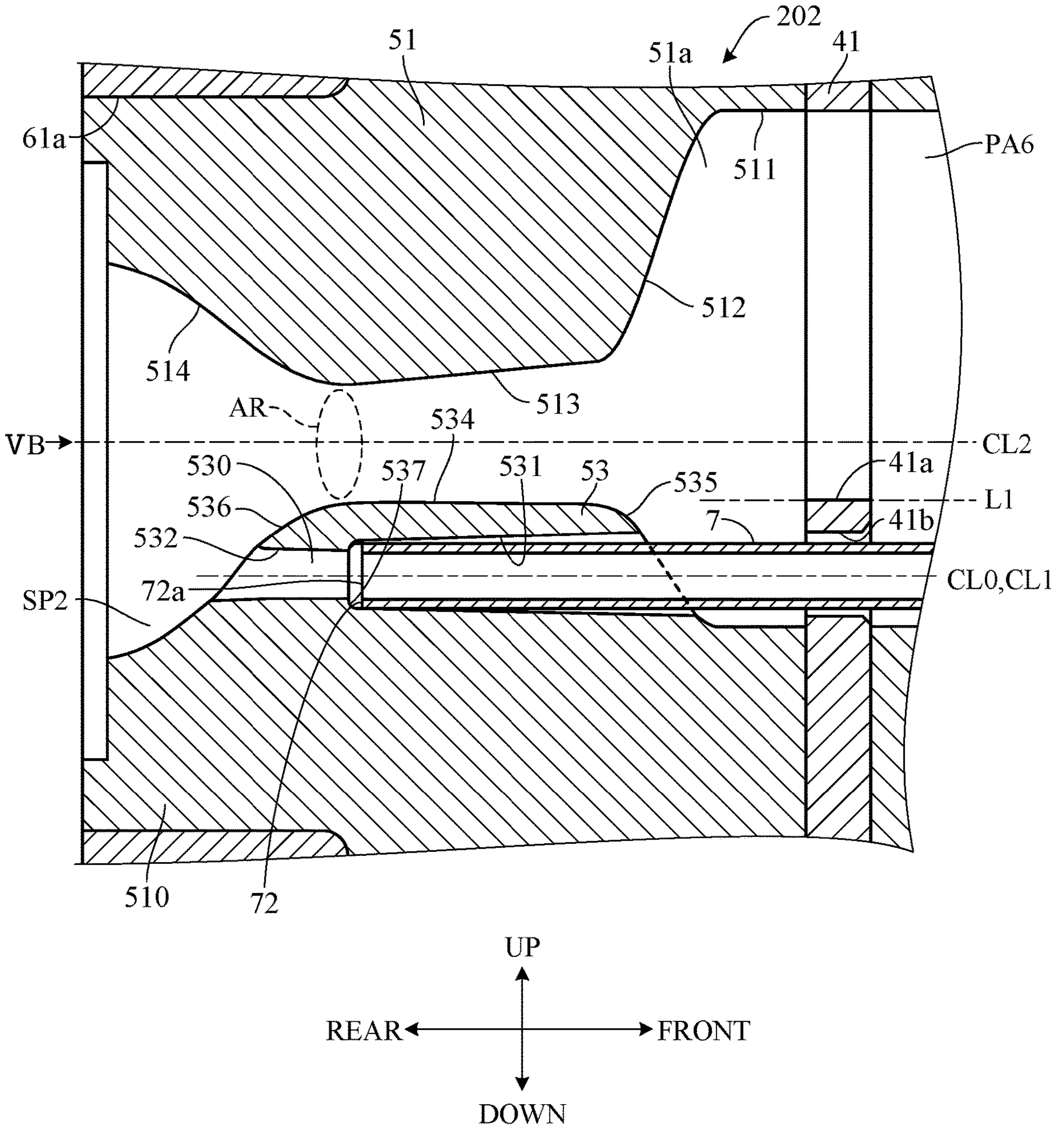
FIG. 5A is an enlarged view of a main part of FIG. 3 illustrating a configuration of a rear support portion included in the fuel cell stack according to the embodiment of the present invention.
Figure 5B:
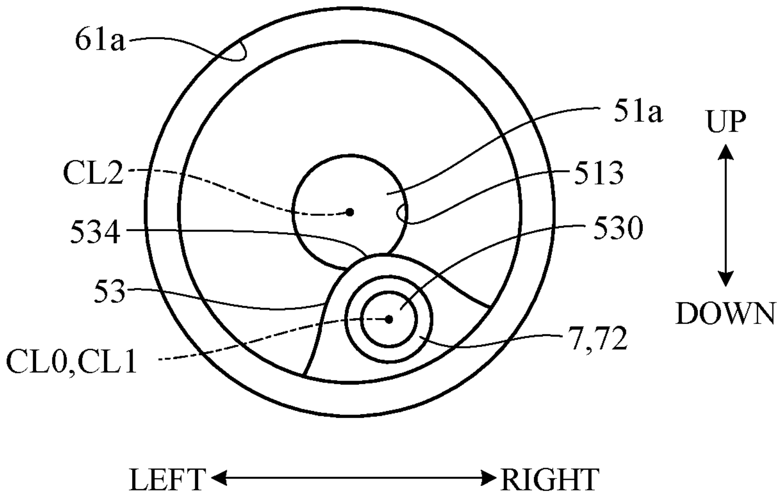
FIG. 5B is a view taken along an arrow VB of FIG. 5A.

FIG. 5A is an enlarged view of a main part of FIG. 3 illustrating a configuration of the rear support portion 202, and FIG. 5B is a view taken along an arrow VB of FIG. 5A (a rear view). As illustrated in FIGS. 5A and 5B, similarly to the front-side insulating plate 50, a bulge 53 bulging upward is provided on a bottom surface of through-hole 51*a* of the insulating plate 51 in the front-rear direction. A top portion 534 (upper end) of the bulge 53 extends in the front-rear direction along a virtual extension line L1 obtained by extending a peripheral surface of the through-hole 41*a* of the terminal plate 41 rearward. The bulge 53 bulges from a position slightly displaced rightward from the lowermost portion of the inner peripheral surface of the insulating plate 51 (FIG. 5B), but this degree of displacement does not adversely affect the drainage performance through the communicating tube 7.

A through-hole 530 having a circular cross section around the axis CL0 is opened in the bulge 53 from a front end surface 535 to a rear end surface 536 thereof. The through-hole 530 includes a tapered portion 531 on the front side of the boundary surface 537 and a straight portion 532 on the rear side of the boundary surface 537 with the boundary surface 537 extending in the vertical direction perpendicular to the axis CL0 as a boundary. The insulating plate 51 has a protrusion 510 protruding rearward, and the protrusion 510 is located inside the through-hole 61*a* of the end plate 61. Therefore, the insulating plate 51 is partially elongated in the front-rear direction, and the rear end portion of the communicating tube 7 is supported by the elongated portion.

The tapered portion 531 is formed in a tapered shape such that the cross-sectional area gradually decreases from the front end surface 535 of the bulge 53 to the boundary surface 537. That is, the tapered portion 531 is formed to have a space of a truncated cone inside. The straight portion 532 is formed linearly with a constant or substantially constant cross-sectional area from the rear end surface 536 of the bulge 53 to the boundary surface 537. A cross-sectional area of the straight portion 532 is smaller than a cross-sectional area of the rear end of the tapered portion 531. An angle formed by the tapered portion 531 with respect to the axis CL0 is about several degrees (for example, 2 to 3° to 4 to 5°), and a length of the tapered portion 531 in the front-rear direction is longer than a length of the straight portion 532 in the front-rear direction.

In the terminal plate 41, a substantially circular through-hole 41*b* is opened below the through-hole 41*a* forming the fuel gas discharge flow path PA6, and the communicating tube 7 is inserted into the through-hole 41*b*. A diameter of an outer peripheral surface of the communicating tube 7 is larger than a diameter of the rear end surface (boundary surface 537) of the tapered portion 531 and smaller than a diameter of the front end surface 535 of the tapered portion 531. As a result, when the communicating tube 7 is inserted into the through-hole 530 from the front of the bulge 53, the outer peripheral corner of the rear end of the communicating tube 7 abuts on a peripheral surface of the tapered portion 531, and the center line CL1 of the communicating tube 7 coincides with the axis CL0. As a result, the rear end of the communicating tube 7 can be supported from the insulating plate 51 while the rear end of the communicating tube 7 is positioned by the tapered portion 531. Since the movement of the communicating tube 7 is restricted by the tapered portion 531, positional displacement of the communicating tube 7 can be prevented. In a state where the communicating tube 7 is supported by the rear support portion 202, the rear end opening 72*a* of the communicating tube 7 communicates with the internal space SP2 of the end unit 102, more specifically, the internal space SP2 behind the bulge 53 through the through-hole 530.

Figure 6:
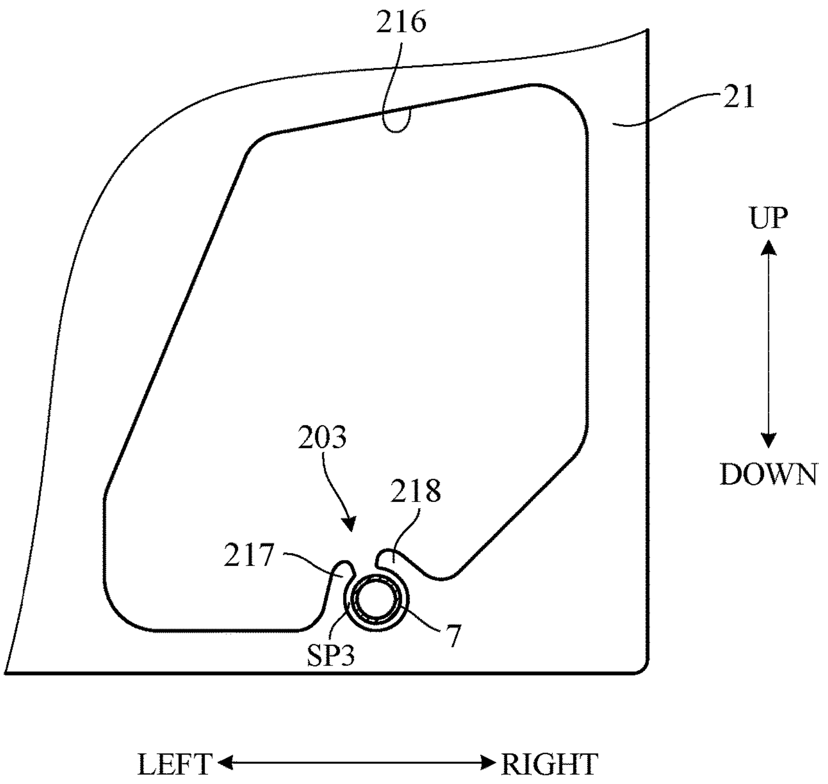
FIG. 6 is an enlarged view of a main part of a frame included in the unitized electrode assembly of FIG. 2.

The communicating tube 7 is supported not only by the front and rear end units 102 but also by a frame 21 of a unitized electrode assembly 2 included in the cell stacked body 101. FIG. 6 is a front view (a portion viewed from the front) illustrating a configuration of the through-hole 216 (FIG. 2) of the frame 21 for discharging fuel gas. FIG. 6 illustrates the shape of the through-hole 216 in FIG. 2 in more detail. As illustrated in FIG. 6, a pair of left and right protrusions 217 and 218 protruding upward is provided on a bottom surface of the through-hole 216 of the frame 21. The protrusions 217 and 218 are formed in a substantially arc shape so as to form a substantially cylindrical space SP3 along the bottom surface of the through-hole 216.

The communicating tube 7 is inserted into the space SP3 from the front or the rear of the cell stacked body 101. A diameter of the space SP3 is slightly larger than an outer diameter of the communicating tube 7 so that the communicating tube 7 can be easily inserted. As a result, an intermediate portion of the communicating tube 7 in the front-rear direction is positioned by the protrusions 217 and 218, and the communicating tube 7 can be more stably supported. However, since the front and rear ends of the communicating tube 7 are positioned by the tapered portions 521 and 531, the protrusions 217 and 218 are provided so as to perform gentle positioning to the extent that the positioning by the tapered portions 521 and 531 is not impaired. Therefore, it is not necessary to increase accuracy of the protrusions 217 and 218 so much.

The protrusions 217 and 218 configure an intermediate support portion 203 that supports an intermediate portion of the communicating tube 7. The intermediate support portion 203 may be provided in all the frames 21 included in the cell stacked body 101, or may be provided in some of the frames 21. The intermediate support portion 203 may be formed by connecting the distal end portions of the protrusions 217 and 218 to each other to provide a single protrusion and providing an opening having a substantially circular shape in a front view in the single protrusion. Although depending on a material of the communicating tube 7, when rigidity of the communicating tube 7 is high and the communicating tube 7 can be firmly supported by the front support portion 201 and the rear support portion 202, the intermediate support portion 203 may be omitted.

In the present embodiment, water accumulated in the reaction exhaust gas flow paths PA3 and PA6 flows rearward through the communicating tube 7, and is discharged to the outside from the through-hole 102*a* of the end unit 102. That is, the through-hole 520, the communicating tube 7, and the through-hole 530 configure a drainage flow path. Such a flow of water occurs when a pressure P1 of the internal space SP1 communicating with the front end opening 71*a* of the communicating tube 7 is larger than a pressure P2 of the internal space SP2 communicating with the rear end opening 72*a*. As a pressure difference ΔP (=P1−P2) between the internal spaces SP1 and SP2 increases, a flow of water is promoted, and a drainage capacity is improved. In the present embodiment, the gas discharge flow paths PA3 and PA6 are configured to improve the drainage capacity, which will be described below.

As illustrated in FIG. 5A, the through-hole 51*a* of the insulating plate 51 is formed around an axis CL2 extending in the front-rear direction. The through-hole 51*a* includes an inlet portion 511, a tapered portion 512, a diaphragm portion 513, and an outlet portion 514 which are provided in order from a front end to a rear end.

The inlet portion 511 is formed in a substantially cylindrical shape around the axis CL2. The tapered portion 512 is formed so as to gradually decrease in diameter at a predetermined angle with respect to the axis CL2 from the inlet portion 511 to the diaphragm portion 513. The diaphragm portion 513 is formed so as to gradually decrease in diameter at a predetermined angle with respect to the axis CL2 from the tapered portion 512 to the outlet portion 514, more specifically, so as to gradually decrease in diameter as compared with the tapered portion 512 at a predetermined inclination angle smaller than the tapered portion 512. In other words, when a change amount (absolute value) of the diameter of the through-hole 51*a* per unit length in the front-rear direction is defined as a decrease rate, a flow path area of the tapered portion 512 gradually decreases at a first decrease rate, and a flow path area of the diaphragm portion 513 gradually decreases at a second decrease rate smaller than the first decrease rate.

An area of the through-hole 51*a* is the smallest in a region AR at the rear end of the diaphragm portion 513. A minimum area of the diaphragm portion 513 is, for example, ¼ or less to ⅕ or less of the area of the inlet portion 511. The outlet portion 514 is formed such that the diameter gradually increases at a predetermined angle with respect to the axis CL2 toward the rear, more specifically, an inclination angle (absolute value) is larger than the inclination angle (absolute value) of the diaphragm portion 513 and smaller than the inclination angle (absolute value) of the tapered portion 512. The inlet portion 511 and the tapered portion 512 are smoothly connected to each other in a concave curved shape, and the tapered portion 512 and the diaphragm portion 513, and the diaphragm portion 513 and the outlet portion 514 are smoothly connected to each other in a convex curved shape.

As shown in FIG. 5A, the front end surface 535 of the bulge 53 is inclined forward and downward from the same position or substantially the same position as the rear end portion of the tapered portion 512 in the front-rear direction at the same or substantially the same inclination angle as the tapered portion 512. Therefore, in a predetermined cross section including the axes CL0 and CL2 as illustrated in FIG. 5A, the front end surface 535 is provided substantially symmetrically with respect to a peripheral surface (tapered surface) of the tapered portion 512 and the axis CL2. In other words, the front end surface 535 is located on the tapered surface. The through-hole 530 (tapered portion 531) is opened in the front end surface 535, and the communicating tube 7 is inserted therethrough.

The top portion 534 of the bulge 53 is separated from the axis CL2 by substantially the same distance as the distance from the axis CL2 to a peripheral surface of the diaphragm portion 513 and extends in the front-rear direction by substantially the same length as the front-rear direction length of the diaphragm portion 513. Therefore, in the predetermined cross section of FIG. 5A including the axes CL0 and CL2, the top portion 534 is provided substantially symmetrically with respect to the diaphragm portion 513 and the axis CL2.

The rear end surface 536 of the bulge 53 is inclined rearward and downward from the same position or substantially the same position as the front end portion of the outlet portion 514 in the front-rear direction at the same or substantially the same inclination angle as the outlet portion 514. Therefore, in the predetermined cross section of FIG. 5A including the axes CL0 and CL2, the rear end surface 536 is provided substantially symmetrically with respect to the peripheral surface of the outlet portion 514 and the axis CL2. The through-hole 530 (straight portion 532) is opened in the rear end surface 536. For this reason, the communicating tube 7 communicates with the fuel gas discharge flow path PA6 downstream (behind) and in the vicinity of the region AR. The bulge 53 is provided to support the rear end portion of the communicating tube 7. Depending on an outer diameter of the communicating tube 7, when the communicating tube 7 can be supported by the insulating plate 51 itself (around the diaphragm portion 513) without the bulge 53, the bulge 53 can be omitted. The bulge 53 may be provided only on the front side of the diaphragm portion 513.

Assembly of the fuel cell stack 100 is performed as follows, for example. First, the dry-side end unit 102 is set on an assembly table in a horizontal posture. Next, separators 3 and unitized electrode assemblies 2 are alternately stacked by a predetermined number while being positioned by a guide rod or the like extending in the vertical direction. Next, the communicating tube 7 is inserted into each of the through-holes 213, 313 and 216, 316 of the cell stacked body 101 from above. At this time, a corner portion of a distal end (lower end) of the communicating tube 7 abuts on the peripheral surface of the tapered portion 521 of the dry-side end unit 102 over the entire circumference. As a result, the communicating tube 7 is positioned, and the position of the axis CL0 of the through-hole 520 of the end unit 102 (insulating plate 50) coincides with the position of the center line CL1 of the communicating tube 7.

Next, the wet-side end unit 102 is stacked. Next, the wet-side end unit 102 is pressurized from above using a cylinder or the like to compress the entire stacked members. Then, the dry-side end plate 60 and the wet-side end plate 61 are fastened to a coupling member such as a coupling plate with bolts to complete assembly of fuel cell stack 100.

In this case, when the wet-side end unit 102 (insulating plate 51) is lowered in a pressurizing step, the peripheral surface of the tapered portion 531 of the through-hole 530 approaches an upper end of the communicating tube 7, and the communicating tube 7 is disposed inside the tapered portion 531. Therefore, the fuel cell stack 100 in which the communicating tube 7 is incorporated can be assembled in a simple process without damaging the communicating tube 7. In a state where the assembly of the fuel cell stack 100 has been completed, there may be a gap in the front-rear direction between one end of communicating tube 7 and the peripheral surface of the tapered portion 521 or 531 so that a compressive force does not act on the communicating tube 7.

Figure 7:
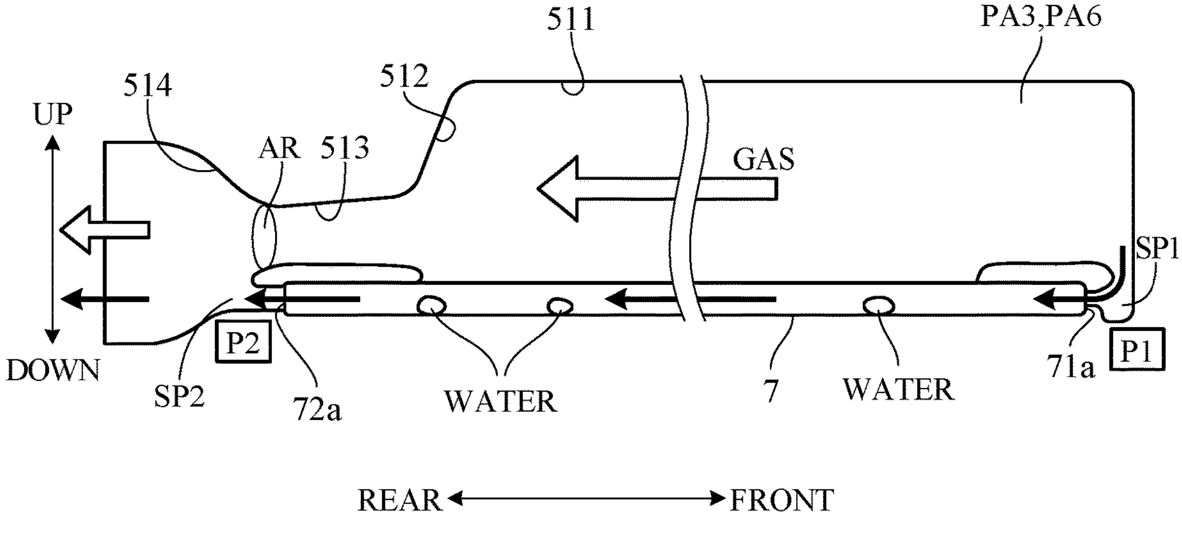
FIG. 7 is a view illustrating an example of an operation of the fuel cell stack according to the embodiment of the present invention.

Main operations of the fuel cell stack 100 according to the present embodiment will be described. FIG. 7 is a view schematically illustrating flows of reaction exhaust gas and wastewater in the reaction exhaust gas flow paths PA3 and PA6. In the present embodiment, the reaction exhaust gas flow paths PA3 and PA6 are configured such that the flow path area gradually decreases in the through-hole 51*a* of the rear insulating plate 51, that is, the areas gradually decrease from the inlet portion 511 to the tapered portion 512 and the diaphragm portion 513. Therefore, a flow rate of the reaction exhaust gas is maximized in the vicinity of the region AR where the flow path area is minimized, and a pressure is minimized by the Venturi effect.

As illustrated in FIG. 7, the rear end opening 72*a* of the communicating tube 7 communicates with the internal space SP2 of the flow paths PA3 and PA6 downstream of the region AR but in the vicinity of the region AR. Therefore, a pressure difference ΔP between a pressure in the internal space SP1 of the flow paths PA3 and PA6 communicating with the front end opening 71*a* of the communicating tube 7 and a pressure in the internal space SP2 increases. As a result, as indicated by arrows in FIG. 7, water in the flow paths PA3 and PA6 flows into the communicating tube 7 from the front end opening 71*a*, passes through the inside of the communicating tube 7, and flows out from the rear end opening 72*a*. The water flowing out is discharged from the fuel cell stack 100 along the flow of the reaction exhaust gas. As described above, in the present embodiment, since the diaphragm portion 513 in which the flow path area gradually decreases is provided at the outlet portions of the reaction exhaust gas flow paths PA3 and PA6, the pressure difference ΔP between the inlet and the outlet of the communicating tube 7 increases, and the drainage performance can be improved. The rear end opening 72*a* of the communicating tube 7 communicates with the outlet portion 514 where the flow path area gradually increases at downstream of the region AR where the flow path area is minimized. A peripheral surface of the outlet portion 514 below the axis CL2 is inclined rearward and downward, and in the outlet portion 514, water flows downward along the inclined surface. Therefore, a flow of water rearward from the rear end opening 72*a* is promoted, and the drainage performance is further enhanced.

Both the front and rear end portions of the communicating tube 7 are supported by the front support portion 201 and the rear support portion 202 through the tapered portions 521 and 531, respectively. Therefore, when a fluid force of the reaction exhaust gas acts on the communicating tube 7 and the communicating tube 7 is pushed rearward, a corner of the rear end surface 72 of the communicating tube 7 abuts on the peripheral surface of the tapered portion 531. Accordingly, the communicating tube 7 is positioned inside the through-hole 530. That is, the communicating tube 7 is held in a state where the axis CL0 of the through-hole 530 and the center line CL1 of the communicating tube 7 coincide with each other, and the inside of the communicating tube 7 and the through-hole 530 communicate with each other in a state where the corner portion of the rear end surface 72 of the communicating tube 7 is sealed. As a result, even when vibration of a vehicle acts on the communicating tube 7, the communicating tube 7 is not displaced, and stable drainage can be secured.

According to the present embodiment, the following operations and effects are achievable.

(1) The fuel cell stack 100 includes the cell stacked body 101 formed by stacking the plurality of power generation cells 1 each having an electrolyte membrane in the front-rear direction, and in the fuel cell stack 100, the reaction exhaust gas flow paths PA3 and PA6 penetrating the cell stacked body 101 in the front-rear direction are provided so as to discharge the reaction gas guided to the plurality of power generation cells 1 (FIG. 1). The fuel cell stack 100 further includes the communicating tube 7 disposed in each of the reaction exhaust gas flow paths PA3 and PA6 and having the front end opening 71*a* and the rear end opening 72*a* communicating with the internal space SP1 on the upstream side and the internal space SP2 on the downstream side of the reaction exhaust gas flow paths PA3 and PA6, respectively (FIG. 3). Each of the reaction exhaust gas flow paths PA3 and PA6 has a reduced diameter portion in which the flow path area gradually decreases toward the outlet (the rear end of the outlet portion 514) of each of the reaction exhaust gas flow paths PA3 and PA6, that is, the tapered portion 512 and the diaphragm portion 513 (FIG. 5A). The rear end opening 72*a* of the communicating tube 7 communicates with each of the reaction exhaust gas flow paths PA3 and PA6 between a small diameter end portion (rear end portion) of the diaphragm portion 513 and a flow path outlet (rear end of the outlet portion 514) (FIG. 5A).

With gradual reduction in the flow path areas of the reaction exhaust gas flow paths PA3 and PA6 in this manner, the pressure P2 of the internal space SP2 in the vicinity of the rear end opening 72*a* of the communicating tube 7 is reduced by the Venturi effect. In particular, since the flow paths PA3 and PA6 are smoothly formed from the inlet portions 511 to the outlet portions 514, a pressure loss is small, and a pressure in the internal space SP2 can be efficiently reduced. As a result, the pressure difference ΔP between the front and the rear of the communicating tube 7 increases, and therefore, the water can be discharged well through the communicating tube 7.

(2) The reaction exhaust gas flow paths PA3 and PA6 each has an outlet portion 514 that is continuous with an end portion on the small diameter side of the diaphragm portion 513 and has a flow path area gradually increasing toward the flow path outlet side (FIG. 5A). The rear end opening 72*a* communicates with the outlet portion 514 (FIG. 5A). Consequently, the water flowing out of communicating tube 7 flows downward through the inclined peripheral surface (tapered surface) of the outlet portion 514, so that the drainage from the fuel cell stack 100 can be promoted.

(3) The fuel cell stack 100 further includes the bulge 53 that bulges upward from the bottom surfaces of the reaction exhaust gas flow paths PA3 and PA6 and supports the rear end portion of the communicating tube 7 (FIG. 5A). The communicating tube 7 penetrates the bulge 53 in the front-rear direction (FIG. 5A). As a result, the bulge 53 that supports the communicating tube 7 can function as a part of the diaphragm portion 513, and an adverse effect on the gas flow due to the provision of the bulge 53 can be suppressed. In addition, the communicating tube 7 can be easily supported.

(4) The reduced diameter portion of each of the reaction exhaust gas flow paths PA3 and PA6 includes the tapered portion 512 having a substantially circular cross section in which the flow path area gradually decreases at the first decrease rate toward the flow path outlet, and the diaphragm portion 513 having a substantially circular cross section in which the flow path area gradually decreases at the second decrease rate smaller in degree of decrease than the first decrease rate from the end portion on the small diameter side of the tapered portion 512 toward the flow path outlet (FIG. 5A). As a result, the separation of the gas flow can be favorably suppressed over the region AR of the minimum diaphragm, and the pressure of the internal space SP2 can be favorably reduced.

(5) The fuel cell stack 100 further includes the insulating plates 50 and 51 respectively disposed at both ends in the front-rear direction of the cell stacked body 101 (FIGS. 4A, and 5A). The reduced diameter portion (tapered portion 512, diaphragm portion 513) is provided in the insulating plate 51 (FIG. 5A). As a result, the reduced diameter portion having a smooth curved surface can be easily formed by resin molding or the like.

(6) As another viewpoint from the above, the fuel cell stack 100 includes the end unit 102 disposed outside the cell stacked body 101 in the front-rear direction, and the communicating tube 7 disposed in each of the reaction exhaust gas flow paths PA3 and PA6, and provided with the front end opening 71*a* and the rear end opening 72*a* on the front end surface 71 and the rear end surface 72, respectively, which communicate with the upstream side and the downstream side of each of the reaction exhaust gas flow paths PA3 and PA6 (FIGS. 1 and 3). The end unit 102 includes the front support portion 201 and the rear support portion 202 that support the front end portion and the rear end portion of the communicating tube 7, respectively (FIG. 3). The front support portion 201 is formed in a tubular shape around the axis CL0 so as to surround the front end portion of the communicating tube 7 and communicate an internal space of the communicating tube 7 with an upstream side of each of the reaction exhaust gas flow paths PA3 and PA6, and the through-hole 520 along the axis CL0 is provided inside the front support portion 201 (FIG. 4A). The rear support portion 202 is formed in a tubular shape around the axis CL0 so as to surround the rear end portion of the communicating tube 7 and communicate the internal space of the communicating tube 7 with the downstream side of each of the reaction exhaust gas flow paths PA3 and PA6, and a through-hole 530 along the axis CL2 is provided inside the rear support portion 202 (FIG. 5A). The through-hole 520 and the through-hole 530 have tapered portions 521 and 531 formed in a tapered shape with the axis CL0 as the center so that an edge portion (corner portion) on the outer peripheral surface side of the front end surface 71 and an edge portion (corner portion) on the outer peripheral surface side of the rear end surface 72 can abut on the peripheral surfaces of the through-holes 520 and 530 over the entire circumference in the circumferential direction when the communicating tube 7 is inserted (FIGS. 4A and 5A).

As a result, a part of the outer peripheral surface of the end portion of the communicating tube 7 abuts on the peripheral surfaces of the tapered portions 521 and 531 by a fluid force of the reaction exhaust gas, and the communicating tube 7 is held in a state where the axis CL0 of the through-holes 520 and 530 and the center line CL1 of the communicating tube 7 coincide with each other. As a result, even when there is vibration of the vehicle or when the fluid force due to the reaction exhaust gas changes, rattling and positional displacement of the communicating tube 7 can be prevented, and good drainage can be realized through the communicating tube 7. That is, if the position of the center line CL1 of the communicating tube 7 deviates from the axis CL0, a cross-sectional area of the rear end opening 72*a* of the communicating tube 7 may substantially decrease, which makes it difficult to ensure stable drainage performance. In this regard, in the present embodiment, displacement of the position of the center line CL1 from the axis CL0 is suppressed, and stable drainage performance is obtained.

(7) The through-hole 520 and the through-hole 530 further include straight portions 522 and 532 connected to the end portions of the tapered portions 521 and 531 on the small diameter side, that is, the front end portion of the tapered portion 521 and the rear end portion of the tapered portion 531, and formed in a straight shape along the axis CL0 (FIGS. 4A and 5A). Consequently, water can smoothly flow into the communicating tube 7 through the straight portion 522, and water can smoothly flow out of the fuel cell stack 100 through the straight portion 532.

As described above, the rear end opening 72*a* of the communicating tube 7 communicates with the flow paths AR3 and AR6 behind the region AR where the diaphragm portion 513 has the minimum diaphragm, that is, downstream of the reaction exhaust gas flow paths PA3 and PA6 with respect to the minimum diaphragm (FIG. 5A). In this regard, considering that the larger the pressure difference ΔP between the front and the rear of the communicating tube 7 is, the easier the water flows in the communicating tube 7 and the higher the drainage performance is, a position where the rear end opening 72*a* communicates with the reaction exhaust gas flow paths PA3 and PA6 is preferably closer to the region AR where the pressure in the flow paths PA3 and PA6 is the lowest. In consideration of this point, the rear support portion 202 may be configured as follows.

Figure 8A:
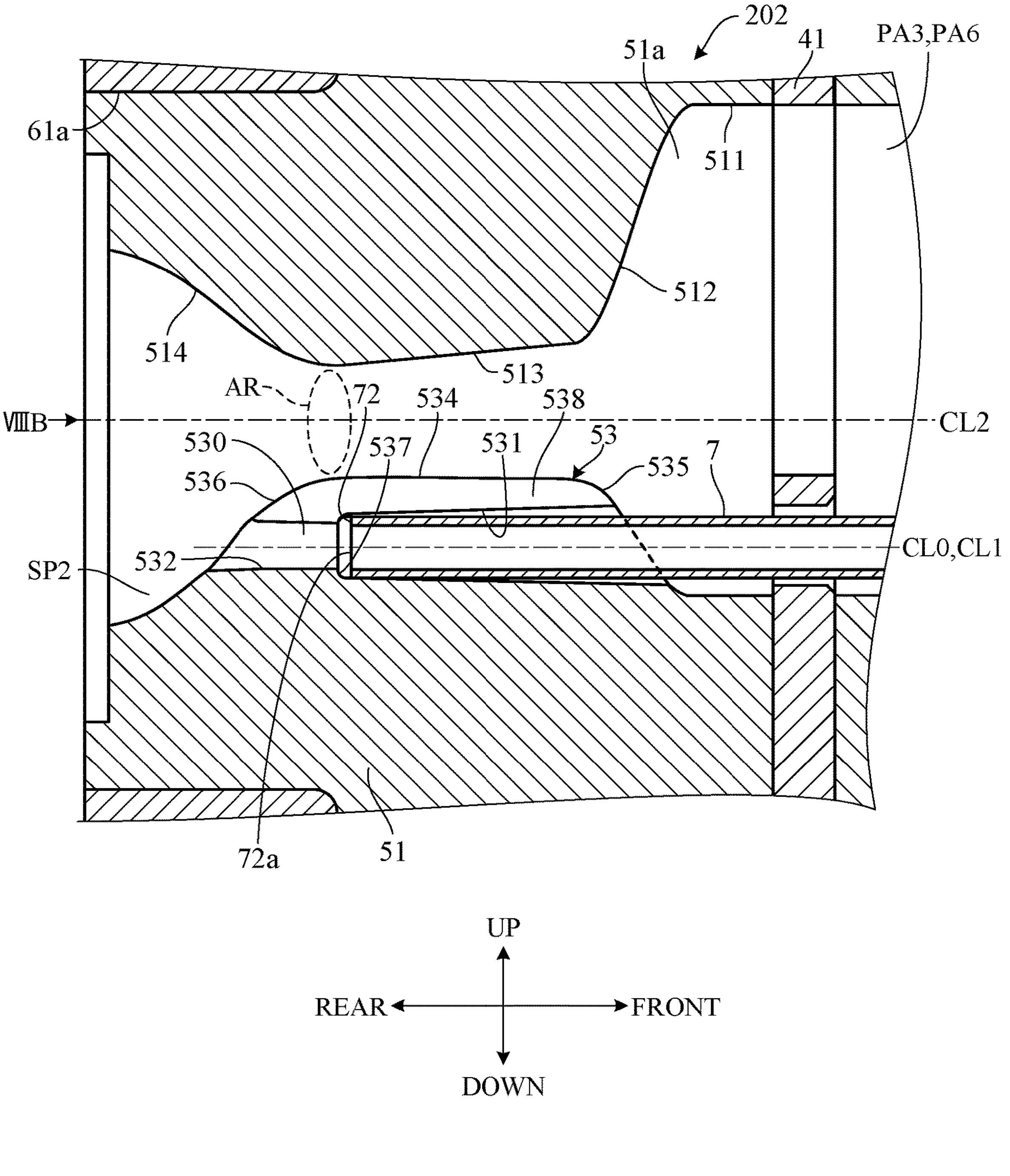
FIG. 8A is a view illustrating another example of the rear support portion included in the fuel cell stack according to the embodiment of the present invention.
Figure 8B:
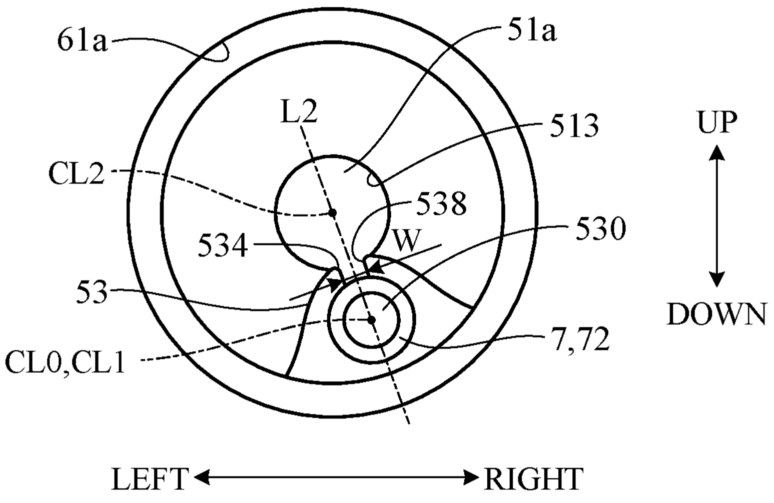
FIG. 8B is a view taken along an arrow VIIIB of FIG. 8A.

FIG. 8A is a view illustrating another example (modification of FIG. 5A) of the rear support portion 202, and FIG. 8B is a view taken along an arrow VIIIB (viewed from the rear) in FIG. 8A. In FIG. 8A, reaction exhaust gas flow paths PA3 and PA6 are shown instead of the fuel gas discharge flow path PA6 in FIG. 5A. As illustrated in FIGS. 8A and 8B, a notch 538 penetrating the bulge 53 in the radial direction toward the axis CL0 at the center of the through-hole 530 is provided at the top portion 534 of the bulge 53. As illustrated in FIG. 8B, the notch 538 is provided symmetrically with respect to an imaginary line L2 connecting the axes CL0 and CL2, and a pair of left and right facing surfaces of the notch 538 facing each other extends substantially parallel to the imaginary line L2. Therefore, a width W of the notch 538 in a left-right direction is kept constant over a radial direction.

The notch 538 extends from the front end surface 535 to the rear end surface 536 of the bulge while keeping the width W constant. With provision of the notch 538, the rear end opening 72*a* of the communicating tube 7 communicates with the region AR of the reaction exhaust gas flow paths PA3 and PA6 through the notch 538. As a result, since the pressure at the rear end opening 72*a* further decreases, the pressure difference ΔP between the inlet and the outlet of the communicating tube 7 increases, and the drainage performance can be further improved.

Figure 9A:
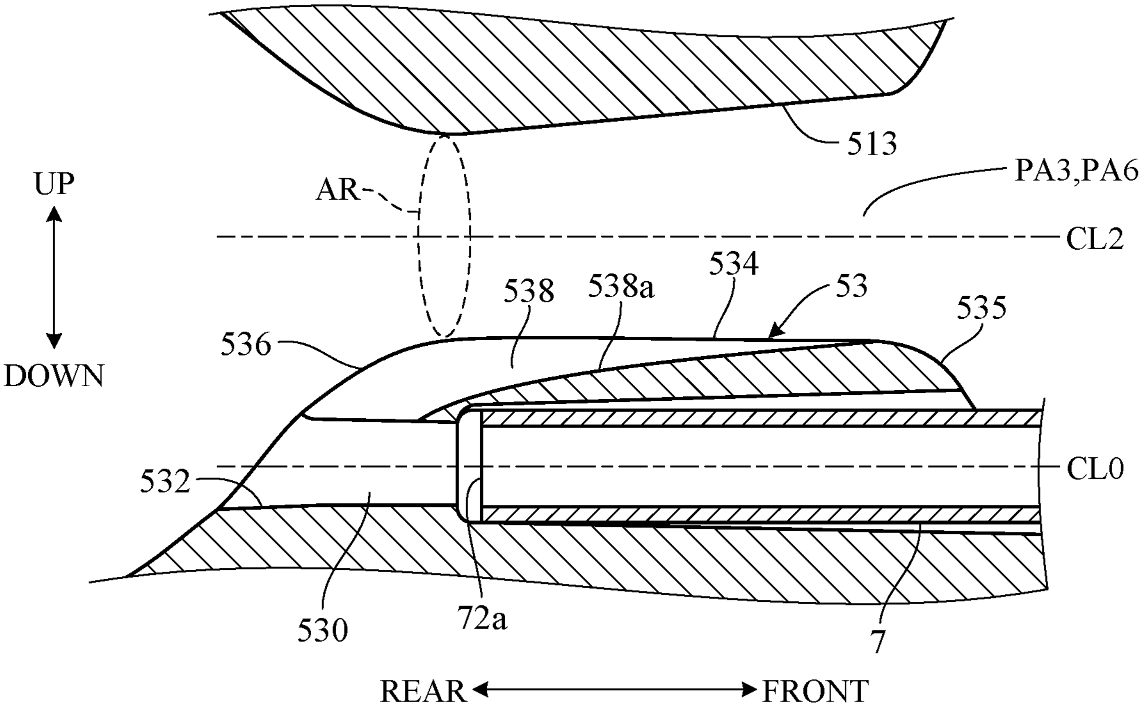
FIG. 9A is a view illustrating another example of a notch of FIG. 8A.
Figure 9B:
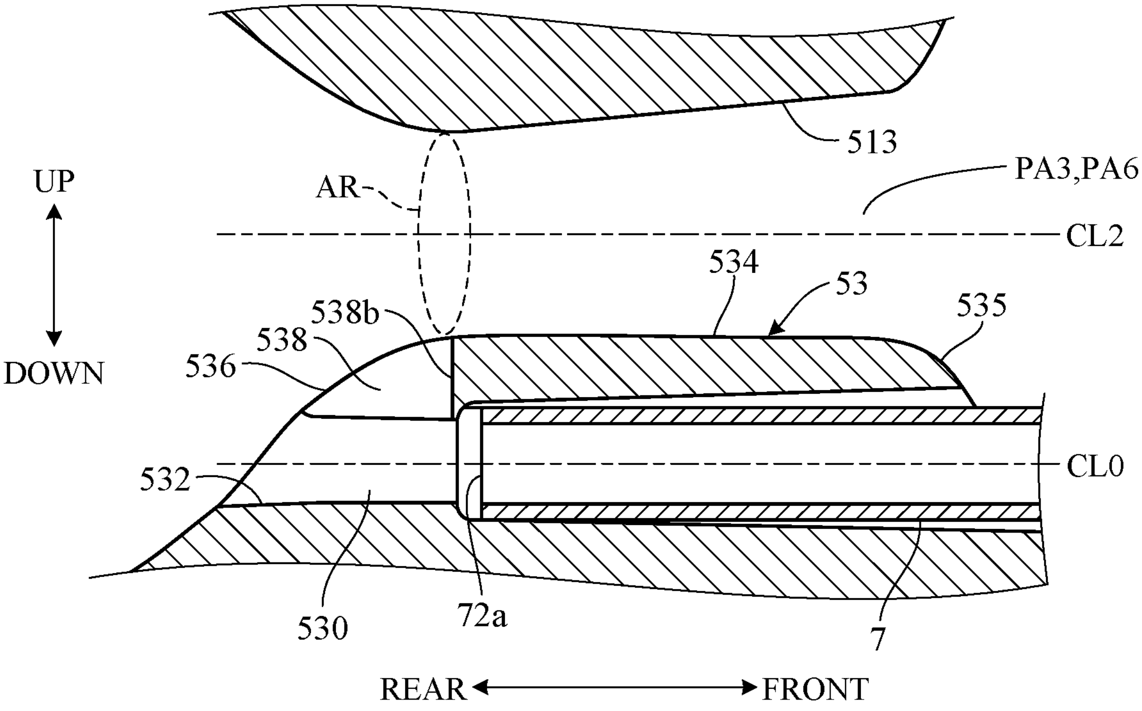
FIG. 9B is a view illustrating a further example of a notch of FIG. 8A.

The width W of the notch 538 may be kept constant or may be changed in the front-rear direction. For example, the width W may gradually decrease toward the rear of the notch 538. As a result, since a flow rate of the reaction exhaust gas gradually increases, the discharge of water from the communicating tube 7 can be further promoted. The configuration of the notch 538 is not limited to that described above. FIGS. 9A and 9B are views illustrating other examples of the notch 538. In FIG. 9A, a part of the notch 538 from above is a bottomed groove without reaching the through-hole 530. The notch 538 is provided such that a bottom surface 538*a* of the bottomed groove obliquely extends rearward and downward from the upper end of the front end surface 535 of the bulge 53. The bottom surface 538*a* of the bottomed groove intersects the through-hole 530 below the region AR. As a result, the rear end opening 72*a* of the communicating tube 7 communicates with the reaction exhaust gas flow paths PA3 and PA6 below the region AR through the notch 538.

Therefore, a part of the reaction exhaust gas flows from the reaction exhaust gas flow paths PA3 and PA6 along the bottomed groove facing the diaphragm portion 513. At this time, the rear end opening 72*a* of the communicating tube 7 communicates with the region AR where the pressure in the flow paths PA3 and PA6 is the lowest through the through-hole 530 and the notch 538. Therefore, the pressure difference ΔP between the front and the rear of the communicating tube 7 increases, and the drainage performance is enhanced.

The bottom surface 538*a* of the bottomed groove is formed obliquely downward so as to approach the axis CL0 toward the rear, and a depth of the bottomed groove gradually increases toward the rear. Since a flow rate of the reaction exhaust gas flowing along the bottomed groove is high, the water in the through-hole 530 can be easily flown out from the reaction exhaust gas flow paths PA3 and PA6 along the flow of the reaction exhaust gas. The width W of the groove may be kept constant or may be changed in the front-rear direction. For example, the width W may be gradually reduced toward the rear.

In FIG. 9A, the notch 538 is provided over the entire front-rear direction area of the bulge 53. On the other hand, in FIG. 9B, the notch 538 is provided not over the entire region in the front-rear direction of the bulge 53 but over a predetermined length forward from the rear end surface 536 of the bulge 53, that is, over the end surface 538*b* perpendicular to the axis CL2 below the region AR. As a result, the rear end opening 72*a* of the communicating tube 7 communicates with the region AR where the pressure in the flow paths PA3 and PA6 is the lowest through the through-hole 530 and the notch 538, so that the drainage performance is enhanced.

In the fuel cell stack 100 according to the present embodiment, the rear support portion 202, particularly the bulge 53 is configured as described above, so that the following operations and effects can be further obtained.

(1) In the bulge 53, the notch 538 is extended from the rear end surface 536, which is an end surface on the outlet side of each of the reaction exhaust gas flow paths PA3 and PA6, toward the front, which is the upstream side of each of the reaction exhaust gas flow paths PA3 and PA6, so that the rear end opening 72*a* at the outlet of the communicating tube 7 communicates with the end on the small diameter side of the diaphragm portion 513 of each of the reaction exhaust gas flow paths PA3 and PA6 (FIGS. 8A, 9A, and 9B). As a result, the pressure at the rear end opening 72*a* of the communicating tube 7 communicates with the region AR where the pressure is lowest in each of the flow paths PA3 and PA6, so that the pressure difference ΔP between the front and the rear of the communicating tube 7 increases, and the drainage effect can be further enhanced.

(2) The notch 538 can also be provided to communicate with a bottomed groove provided in the top portion 534 of the bulge 53 facing each of the reaction exhaust gas flow paths PA3 and PA6 (FIG. 9A). In this case, the bottomed groove is obliquely extended rearward and downward so that the bottom surface 538*a* of the groove gradually approaches the communicating tube 7 toward the outlet of each of the reaction exhaust gas flow paths PA3 and PA6 (FIG. 9A). This makes it possible to adjust a position where the bottomed groove and the through-hole 530 cross each other. Therefore, the rear end opening 72*a* of the communicating tube 7 can satisfactorily communicate with the region AR in each of the flow paths AR3 and AR6, and the pressure of the rear end opening 72*a* can be easily reduced. In addition, since the reaction exhaust gas in the flow paths PA3 and PA6 flows obliquely downward toward the center line CL1 of the communicating tube 7 along the bottomed groove, the reaction exhaust gas collides with the water flowing out from the rear end opening 72*a* and flows rearward, and the water discharge effect is enhanced.

(3) The notch 538 may be provided such that the width W of the notch 538 gradually decreases toward the outlet of each of the reaction exhaust gas flow paths PA3 and PA6. As a result, since the flow rate of the reaction exhaust gas along the notch 538 gradually increases, the discharge of water from the communicating tube 7 can be further promoted.

Figure 10:
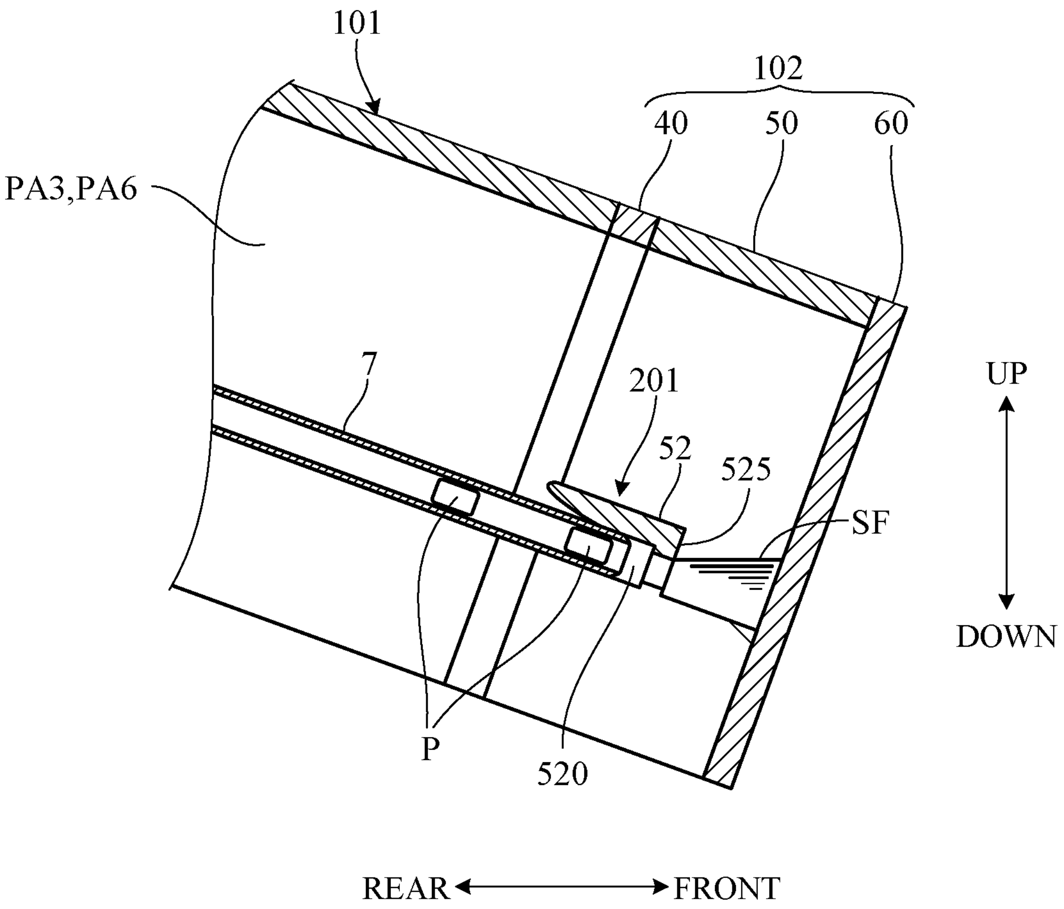
FIG. 10 is a view illustrating an example of a drainage operation through a communicating tube.

In the present embodiment, water is discharged to the outside of the fuel cell stack 100 through the communicating tube 7. However, when a plug flow occurs inside the communicating tube 7, water may not be discharged well through the communicating tube 7. For example, as shown in FIG. 10, when a vehicle is inclined by traveling on a slope and the fuel cell stack 100 takes an upwardly inclined posture toward the rear, a water surface SF of water accumulated on the bottom surfaces of the reaction exhaust gas flow paths PA3 and PA6 is located above the through-hole 520 of the front end surface 525 of the bulge 52, and the through-hole 520 is immersed in water. At this time, water may be sucked into the communicating tube 7 in the form of a substantially cylindrical plug flow P covering the entire cross section of the communicating tube 7. In this case, it is difficult to move the water obliquely upward in the communicating tube 7 against the gravity of a water lump, and the drainage performance is deteriorated. Hereinafter, a configuration of the present embodiment in consideration of this point will be described.

Figure 11A:
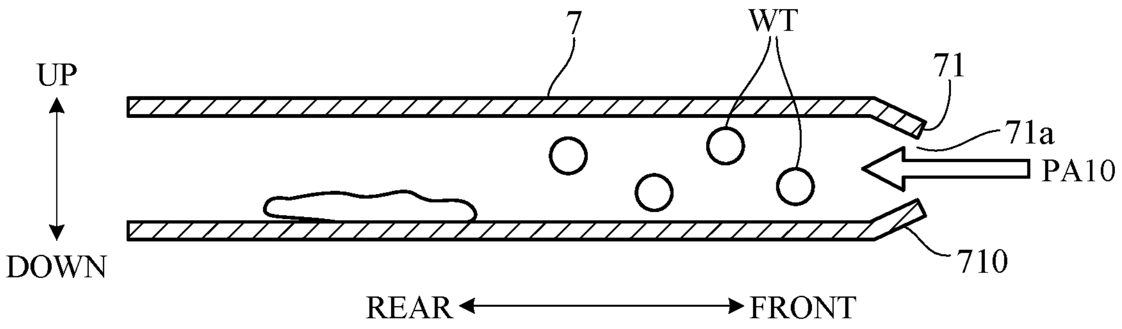
FIG. 11A is a view schematically illustrating an example of a configuration of an inlet portion of the communicating tube included in the fuel cell stack according to the embodiment of the present invention.
Figure 11B:
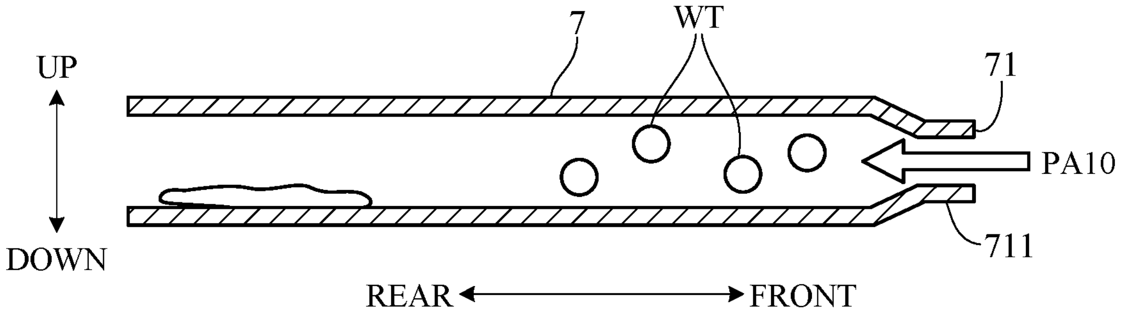
FIG. 11B is a view illustrating a modification of FIG. 11A.
Figure 11C:
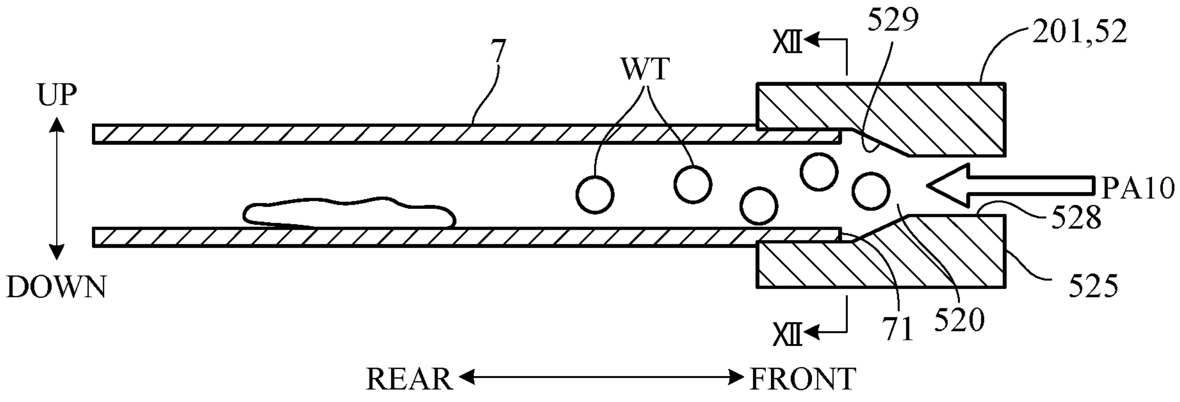
FIG. 11C is a view illustrating a further modification of FIG. 11A.

FIGS. 11A to 11C are views schematically showing an example of a configuration of an inlet of the communicating tube 7. In FIGS. 11A and 11B, illustration of the front support portion 201 (bulge 52) that supports the front end portion of the communicating tube 7 is omitted, and in FIG. 11C, the configuration of the front support portion 201 is schematically simplified. At the bottom of each of the reaction exhaust gas flow paths PA3 and PA6, the through-hole 520 provided in the bulge 52, the communicating tube 7, and the through-hole 530 provided in the bulge 53 configure a drainage flow path PA10 (for convenience, indicated by an arrow) extending in the front-rear direction. FIGS. 11A to 11C mainly illustrate the inlet of the drainage flow path PA10. The inlet of the drainage flow path PA10 refers to a section to the front end portion of the communicating tube 7 along the flow of the reaction exhaust gas, and includes the through-hole 520 and the inlet of the communicating tube 7.

In the example of FIG. 11A, a diaphragm portion 710 is provided at the front end portion of the communicating tube 7, and the front end portion of the communicating tube 7 is formed in a tapered shape such that the inner diameter of the communicating tube 7 gradually increases from the front end surface 71 (front end opening 71*a*) toward the rear. As a result, the drainage flow path P10 is narrowed at the inlet of the communicating tube 7, and the flow rate of the reaction exhaust gas flowing through the communicating tube 7 increases. As a result, as shown in the drawing, water can be dispersed in water droplets WT in the communicating tube 7. Therefore, it is possible to suppress the occurrence of a plug flow in the communicating tube 7, and a flow of water rearward is promoted.

In the example of FIG. 11B, a diaphragm portion 711 at the front end portion of the communicating tube 7 extends straight from the front end surface 71 rearward by a predetermined length. That is, the diaphragm portion 711 is formed in a straight shape, and the communicating tube 7 is formed in a tapered shape behind the diaphragm portion 711 such that the inner diameter of the communicating tube 7 gradually increases from the rear end to the rear side of the diaphragm portion 711. Also in this case, a flow rate of the reaction exhaust gas is increased by narrowing the drainage flow path PA10 at the inlet of the communicating tube 7, so that it is possible to suppress generation of a plug flow in the communicating tube 7.

In the example of FIG. 11C, unlike the examples of FIGS. 11A and 11B, a diaphragm portion 528 is provided in the through-hole 520 of the front support portion 201 (bulge 52). The diaphragm portion 528 has a smaller diameter than the straight portion 522 in FIG. 4A, and extends straight rearward from the front end surface 525 of the bulge 52. A tapered portion 529 is provided on the rear side of the diaphragm portion 528 so as to be continuous with the diaphragm portion 528 and gradually increase in inner diameter toward the rear side. The front end portion of the communicating tube 7 is inserted from the rear side toward the tapered portion 529. Also in this case, a flow rate of the reaction exhaust gas is increased by narrowing the drainage flow path PA10 at the inlet of the communicating tube 7, so that it is possible to suppress generation of a plug flow in the communicating tube 7. In particular, in FIG. 11C, the configuration is easy because a shape of the through-hole 520 of the bulge 52 is simply changed from that in FIG. 4A without providing a diaphragm in the communicating tube 7.

Figure 12A:
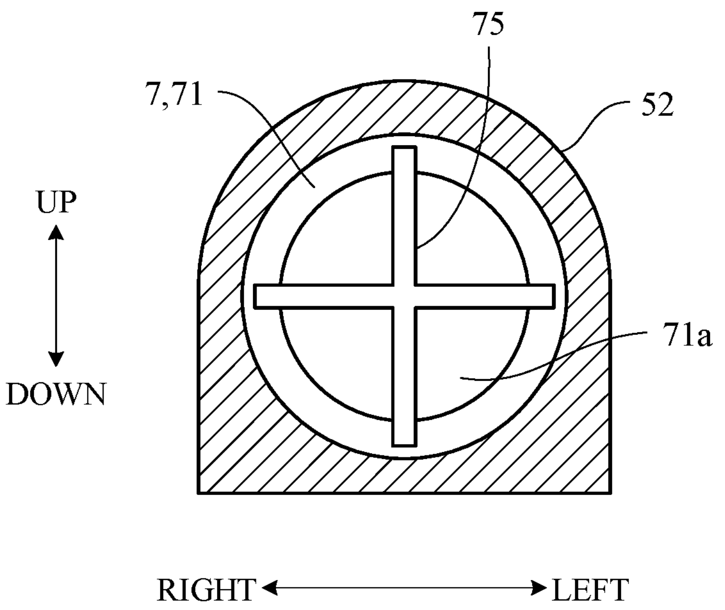
FIG. 12A is a cross-sectional view taken along a line XII-XII of FIG. 11C.

In addition to providing the diaphragm portion at the inlet of the communicating tube 7, a division portion that divides a lump of water can also be provided. FIG. 12A is a cross-sectional view taken along a line XII-XII of FIG. 11C illustrating an example of the division portion. As illustrated in FIG. 12A, the division portion 75 is a substantially cross-shaped thin plate attached to the front end surface 71 so as to cross the front end opening 71*a*. With provision of the division portion 75 at the inlet of the communicating tube 7 in this manner, when water flows into the communicating tube 7, a lump of water is divided (divided into four) by the division portion 75, and the effects of suppressing generation of a plug flow is further enhanced.

Figure 12B:
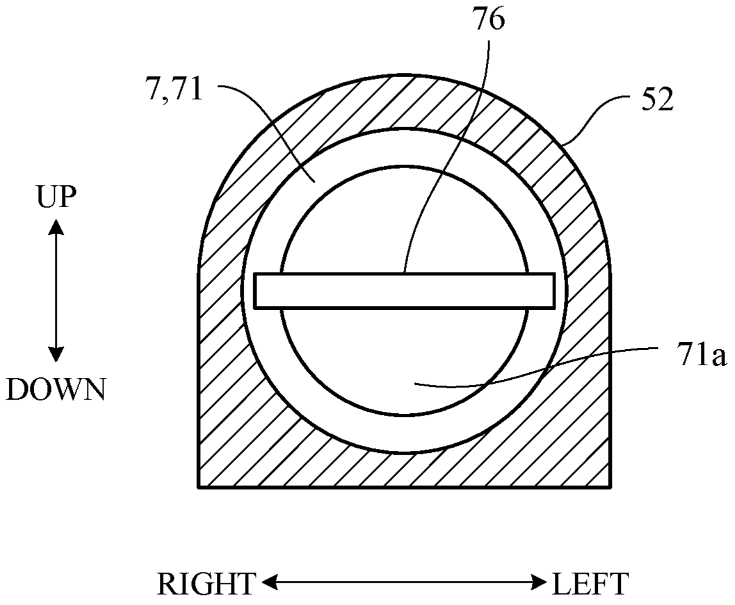
FIG. 12B is a view illustrating a modification of FIG. 12A.
Figure 12C:
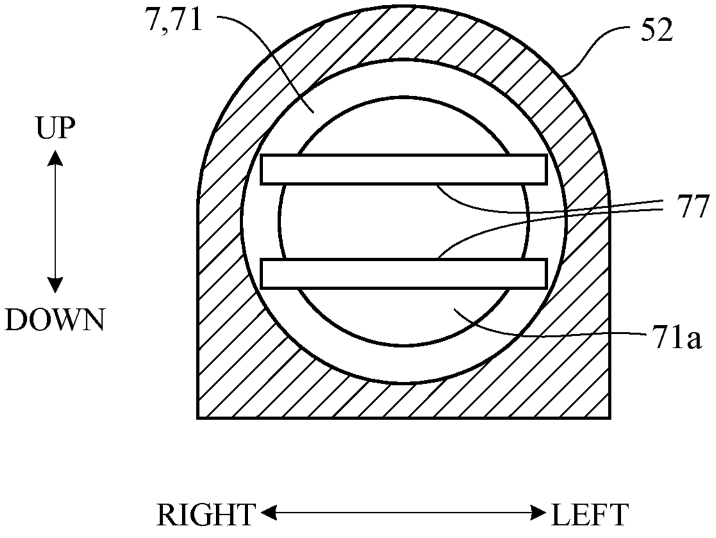
FIG. 12C is a view illustrating another modification of FIG. 12A.
Figure 12D:
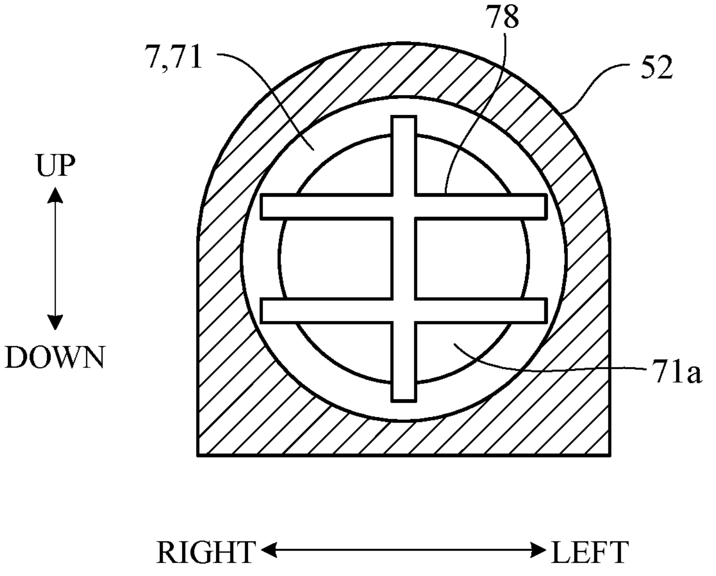
FIG. 12D is a view illustrating a further modification of FIG. 12A.

A shape of the division portion is not limited to that illustrated in FIG. 12A. For example, as illustrated in FIG. 12B, an elongated single plate-like division portion 76 may be attached to the front end surface 71 of the communicating tube 7 across a center of the front end opening 71*a* so as to divide the front end opening 71*a* into two. As illustrated in FIG. 12C, a pair of elongated plate-shaped division portions 77 may be attached to the front end surface 71 of the communicating tube 7 so as to divide the front end opening 71*a* into three. As illustrated in FIG. 12D, a division portion 78 may be formed, and the front end opening 71*a* may be divided into a larger number.

A position where the division portions 75 to 78 are provided is not limited to the front end surface 71 of the communicating tube 7 downstream of the diaphragm portion 528 (FIG. 11C). For example, the division portions 75 to 78 may be provided on the front end surface 525 of the bulge 52, that is, upstream of the diaphragm portion 528 so as to cross the through-hole 520. The division portions 75 to 78 may be provided in the middle of the diaphragm portion 528.

With the configuration of the inlet of the communicating tube 7 as described above, according to the present embodiment, the following operations and effects are further achievable.

(1) The fuel cell stack 100 includes bulges 52 and 53 and the communicating tube 7 as a flow path forming portion that forms a drainage flow path through which water flows from the upstream side to the downstream side of reaction exhaust gas flow paths PA3 and PA6 (FIGS. 3, 4A, and 5A). The communicating tube 7 is disposed in each of the reaction exhaust gas flow paths PA3 and PA6 (FIG. 3). In the communicating tube 7, the front end opening 71*a* and the rear end opening 72*a* communicating with the upstream side and the downstream side of each of the reaction exhaust gas flow paths PA3 and PA6, respectively, are opened (FIG. 3). The flow path forming portion has the diaphragm portions 710, 711, and 528 at the inlet of the drainage flow path PA10 (FIGS. 11A to 11C).

As a result, the flow path area of the communicating tube 7 is narrowed at the inlet of the communicating tube 7, and the flow rate of the reaction exhaust gas flowing through the communicating tube 7 increases. As a result, water is dispersed in the communicating tube 7, and generation of a plug flow in the communicating tube 7 can be suppressed, so that a rearward flow of water in the communicating tube 7 is promoted.

(2) The diaphragm portions 710 and 711 are provided in the communicating tube 7 (FIGS. 11A and 11B). Accordingly, it is possible to suppress the occurrence of the plug flow only by changing the configuration of the communicating tube 7.

(3) The communicating tube 7 has the front end portion provided with the front end opening 71*a* and the rear end portion provided with the rear end opening 72*a* (FIG. 3). The fuel cell stack 100 includes the front support portion 201 (bulge 52) that supports the front end of the communicating tube 7 (FIGS. 4A and 11C). The bulge 52 is provided with the through-hole 520 communicating with the front end opening 71*a*, and the diaphragm portion 528 is provided in the through-hole 520 (FIG. 11C). According to this configuration, it is possible to suppress the occurrence of the plug flow without forming the communicating tube 7 into a special shape.

(4) The fuel cell stack 100 further includes division portions 75 to 78 that are provided at an inlet of the drainage flow path PA10 so as to cross the drainage flow path PA10 and divide water (FIGS. 12A to 12D). As a result, since a lump of water is divided by the division portions 75 to 78, it is possible to further suppress generation of a plug flow.

(5) The division portions 75 to 78 can be provided in the diaphragm portions 710, 711, and 528 (an end surface of the diaphragm or the inside of the diaphragm). As a result, it is possible to obtain synergistic effects by the diaphragm portions 710, 711, and 528 and the division portions 75 to 78.

In the above embodiment, the communicating tube 7 having a circular cross section in which the front end opening 71*a* as a first opening and the rear end opening 72*a* as a second opening are provided in the front end surface 71 as a first end surface and the rear end surface 72 as a second end surface, respectively, is supported by the front support portion 201 and the rear support portion 202 provided in the front and rear end units 102. In other words, the frond end portion (a first end portion) and the rear end portion (a rear end portion) of the communicating tube 7 are supported by a first support portion and a second support portion. However, the configurations of the first support portion and the second support portion are not limited to the above configurations. That is, as long as being formed in a tubular shape around the axis CL0 so as to surround the front end portion (a first end portion) of the communicating tube 7 and communicate the internal space of the communicating tube 7 with the upstream side of each of the exhaust gas flows paths PA3 and PA6 and having the through-hole 520 (a first through-hole) along the axis provided inside the first support portion, the first support portion may be any configuration. As long as being formed in a tubular shape around the axis CL0 so as to surround the rear end portion (a second end portion) of the communicating tube 7 and communicate the internal space of the communicating tube 7 with the downstream side of each of the exhaust gas flows paths PA3 and PA6 and having the through-hole 530 (a second through-hole) along the axis provided inside the second support portion, the second support portion may be any configuration. In the above embodiment, the insulating plate 51, which is an insulator, is provided with the reduced diameter portion in which the flow path area of each of the reaction exhaust gas flow paths PA3 and PA6 gradually decreases, but the configuration of the reduced diameter portion is not limited to that described above.

In the above embodiment, the tapered portions 521 and 531 are provided so that the edge portion on the outer peripheral surface side of the front end surface 71 of the communicating tube 7 and the edge portion on the outer peripheral surface side of the rear end surface 72 abut on the peripheral surfaces of the tapered portions 521 and 531 over the entire circumference. However, when the edge portions of the front end surface 71 and the rear end surface 72 abut on the peripheral surfaces of the papered portions 521 and 531 over a half circumference or longer in the circumferential direction, the communicating tube 7 can be positioned so that the center line CL1 is coincident with the axis CL0. Therefore, the tapered portion may not be provided over the entire circumference. In the above embodiment, the inner diameter of the communicating tube 7 is smaller than the inner diameter of the straight portion 522 and 532 of the through-holes 520 and 530, but may be the same as the inner diameter of the straight portion 522 and 532 or larger than the inner diameter of the straight portion 522 and 532. The straight portion may be omitted. In the above embodiment, the bulges 52 and 53 bulging upward from the bottom surfaces of the reaction exhaust gas flow path PA3 and PA6 are provided to support the end portions of the communicating tube 7. However, the configurations of the first support portion and the second support portion provided at the end unit 102 as an outside unit are not limited to the above configurations. The predetermined direction along with the power generation cells 1 are stacked is not limited to the front-rear direction, and may be the left-right direction or up-down direction.

In the above embodiment (FIGS. 8A, 9A and 9B), the notch 538 is provided to extend in the front-rear direction at the top portion 534 of the bulge 53. However, as long as being provided forward from the rear end surface 536 of the bulge 53 to communicate with the region AR where the flow path area is minimized, the configuration of the notch may be any configuration. In the above embodiment (FIG. 9A), the bottomed groove is provided obliquely rearward and downward at the top portion 534 of the bulge 53. However, the groove may be provided linearly along the axis CL2 and the configuration of the groove is not limited to the above configuration.

The number, arrangement, and shape of the flow path in the fuel cell stack 100 are not limited to those described above. For example, each of the fuel gas discharge flow path PA6 and the oxidant gas discharge flow path PA3 may be two. Each of the cooling medium discharge flow path PA2 and two cooling medium supply flow path PA5 may be two. The shape of the through-holes 211 to 216, 311 to 316 and 102*a* to 102*f* may be a rectangular shape, a triangular shape, another polygonal shape, a circular shape, an elliptical shape, or the like. The cross-sectional shape of the flow paths PA1 to PA6 is determined in accordance with the shape of the through-holes 211 to 216, 311 to 316, and 102*a* to 102*f* constituting the flow paths PA1 to PA6, and may have a rectangular shape or a circular shape, or may have other shapes. The cross-sectional area of the flow paths PA1 to PA6 is appropriately set in accordance with the required flow rate of gas and cooling medium passing through the flow paths PA1 to PA6. The shape of the through-holes 211 to 216, 311 to 316 of the cell stacked body 101 and the shape of the through-holes 102*a* to 102*f* of the end unit 102 may be different from each other. In the above embodiment, the through-holes 211 to 213, 311 to 313 and 102*a* to 102*c* and the through-holes 214 to 216, 314 to 316 and 102*d* to 102*f* are arranged side by side in the up-down direction at the same position in the left-right direction, respectively, but they may be arranged by shifting their positions in the left-right direction.

In the above embodiment, an example of mounting the fuel cell including the fuel cell stack 100 on a vehicle is described. However, the fuel cell including the fuel cell stack can be mounted on various industrial machines in addition to a moving body other than a vehicle such as an aircraft or a boat, a robot, and the like.

The above embodiment can be combined as desired with one or more of the above modifications. The modifications can also be combined with one another.

According to the present invention, it is possible to prevent a position of an end portion of a tube from shifting from a proper position due to vibration, or fluid forces caused by a flow of reaction gas.

Above, while the present invention has been described with reference to the preferred embodiments thereof, it will be understood, by those skilled in the art, that various changes and modifications may be made thereto without departing from the scope of the appended claims.

What is claimed is:

1. A fuel cell stack comprising:

a cell stacked body formed by stacking a plurality of power generation cells each having an electrolyte membrane in a predetermined direction;

an exhaust gas flow path penetrating the cell stacked body in the predetermined direction so as to discharge a reaction gas supplied to the plurality of power generation cells;

an outside unit disposed outside the cell stacked body in the predetermined direction; and a communicating tube disposed in the exhaust gas flow path so as to communicate with an upstream side and a downstream side of the exhaust gas flow path respectively through a first opening provided on a first end surface of the communicating tube and a second opening provided on a second surface of the communicating tube, wherein the outside unit includes a first support portion and a second support portion to support a first end portion on a side of the first end surface of the communicating tube and a second end portion on a side of the second end surface of the communicating tube, respectively, the first support portion is formed in a tubular shape around an axis so as to surround the first end portion of the communicating tube and communicate an internal space of the communicating tube with the upstream side of the exhaust gas flow path, the second support portion is formed in a tubular shape around an axis so as to surround the second end portion of the communicating tube and communicate the internal space of the communicating tube with the downstream side of the exhaust gas flow path, a first through-hole and a second through-hole are provided inside the first support portion and the second support portion along the axis, respectively, and each of the first through-hole and the second through-hole includes a tapered portion formed in a tapered shape around the axis so that an edge portion on an outer peripheral surface side of the first end surface and an edge portion on an outer peripheral surface side of the second end surface are capable of abutting on peripheral surfaces of the first through-hole and the second through-hole over a half circumference or longer in a circumferential direction, respectively, when the communicating tube is inserted.

2. The fuel cell stack according to claim 1, wherein each of the first through-hole and the second through-hole further includes a straight portion connected to an end on a small diameter side of the tapered portion and formed in a straight shape along the axis.

3. The fuel cell stack according to claim 2, wherein a length of the tapered portion in the predetermined direction is longer than a length of the straight portion.

4. The fuel cell stack according to claim 1, wherein the first support portion and the second support portion are provided so as to bulge upward from a bottom surface of the exhaust gas flow path.

5. The fuel cell stack according to claim 1, wherein the cell stacked body includes a third support portion protruded toward the exhaust gas flow path to support the communicating tube.

6. The fuel cell stack according to claim 4, wherein the exhaust gas flow path includes a reduced diameter portion configured to gradually decrease a flow path area toward an outlet of the exhaust gas flow path, and the second opening communicates with the exhaust gas flow paths between an end on a small diameter side of the reduced diameter portion and an outlet of the exhaust gas flow path.

7. The fuel cell stack according to claim 6, wherein the second support portion includes a notch extending from an end surface on an outlet side of the exhaust gas flow path to the upstream side of the exhaust gas flow path at the second support portion so that the second opening communicates with the end on the small diameter side of the reduce diameter portion.

8. The fuel cell stack according to claim 7, wherein the second support portion includes a groove extending obliquely at a top of the second support portion so as to gradually approach the communicating tube toward the outlet of the exhaust gas flow path, and the notch is provided to communicate with the groove.

9. The fuel cell stack according to claim 7, wherein the notch is provided so that a width of the notch gradually decreases toward the outlet of the exhaust gas flow path.

10. The fuel cell stack according to claim 1, wherein the outside unit includes a first plate portion adjacent to the cell stacked body in the predetermined direction and a second plated portion adjacent to the first plate in the predetermined direction, and a through-hole portion through which the communicating tube passes is provided in the first plate portion, and the reduced diameter portion is provided in the second plate portion.

* * * * *